United States Patent [19]

Michael et al.

[11] Patent Number: 5,287,458
[45] Date of Patent: * Feb. 15, 1994

[54] BUFFERED ASYNCHRONOUS COMMUNICATIONS ELEMENTS WITH RECEIVE/TRANSMIT CONTROL AND STATUS REPORTING

[75] Inventors: Martin S. Michael, San Jose; Prashant A. Kanhere, Santa Clara; Richard P. Burnley, Mountain View; Franco Iacobelli, Sunnyvale; Ta-Wei Chien, San Jose, all of Calif.

[73] Assignee: National Semiconductor Corporation, Santa Clara, Calif.

[ * ] Notice: The portion of the term of this patent subsequent to Apr. 18, 2006 has been disclaimed.

[21] Appl. No.: 38,713
[22] Filed: Mar. 26, 1993

Related U.S. Application Data

[60] Continuation of Ser. No. 703,572, May 17, 1991, Pat. No. 5,241,660, which is a continuation of Ser. No. 462,841, Dec. 22, 1989, abandoned, which is a continuation of Ser. No. 295,610, Jan. 10, 1989, abandoned, which is a division of Ser. No. 924,797, Oct. 30, 1986, Pat. No. 4,823,312.

[51] Int. Cl.$^5$ .............................................. G06F 13/12
[52] U.S. Cl. .................................... 395/250; 395/275; 395/550; 364/DIG. 2; 364/919; 364/919.4; 364/926.1; 364/926.2; 364/926.3; 364/926.5; 364/926.93; 364/927.95; 364/927.99; 364/929; 364/932.8; 364/933.3; 364/933.62; 364/939.3; 364/939.4; 364/939.5; 364/939.6; 364/940; 364/941.1; 364/941.5; 364/965.4; 364/965.7; 364/971
[58] Field of Search ................. 364/200, 900, DIG. 1, 364/DIG. 2; 395/250, 275, 550; 370/60, 84, 94.1, 112; 375/117; 340/825.5

[56] References Cited

U.S. PATENT DOCUMENTS

| | | | |
|---|---|---|---|
| 4,062,059 | 12/1977 | Suzuki et al. | 395/250 |
| 4,071,887 | 1/1978 | Daly et al. | 395/200 |
| 4,225,919 | 9/1980 | Kyu et al. | 395/325 |
| 4,261,035 | 4/1981 | Raymond | 395/325 |
| 4,368,512 | 1/1983 | Kyu et al. | 395/325 |
| 4,455,608 | 6/1984 | Suzuki et al. | 395/250 |
| 4,491,916 | 1/1985 | Vallhonrat | 395/325 |
| 4,586,189 | 4/1986 | Tyrrell | 375/117 |
| 4,590,467 | 5/1986 | Lare | 340/825.5 |
| 4,590,468 | 5/1986 | Stieglitz | 340/825.5 |
| 4,593,281 | 6/1986 | Lare | 340/825.5 |
| 4,637,015 | 1/1987 | Bobey | 370/85.11 |
| 4,698,802 | 10/1987 | Groke et al. | 370/60 |
| 4,744,079 | 5/1988 | Csapo et al. | 370/94.1 |
| 4,759,014 | 7/1988 | Decker et al. | 370/84 |
| 4,761,800 | 8/1988 | Lese et al. | 375/117 |
| 4,823,312 | 4/1989 | Michael et al. | 395/250 |
| 4,829,473 | 5/1989 | Keller et al. | 341/50 |
| 4,833,655 | 5/1989 | Wolf et al. | 365/221 |
| 4,942,515 | 7/1990 | Marzucco et al. | 395/275 |

OTHER PUBLICATIONS

*Signetics MOS Microprocessor Data Manual*, pp. 1–68 to 1–85 (1983).

*Zilog 1983/84 Components Data Book*, vol. 3, pp. 267–287 (10th Ed. 1983/1984).

Primary Examiner—Thomas C. Lee
Assistant Examiner—Matthew C. Fagan
Attorney, Agent, or Firm—Limbach & Limbach

[57] ABSTRACT

An asynchronous communications element which incorporates user-selectable FIFOs both as transmitter and receiver buffers to reduce CPU interrupt overhead. The asynchronous communications element includes a receiver shift register which receives serial data transfers from a communication station, a receiver FIFO which receives parallel data transfers from the receiver shift register for transfer to the CPU, a transmitter FIFO which receives parallel data transfers from the CPU, and a transmitter shift register which receives parallel data transfers from the transmitter FIFO for serial transfer to the communications station. A transmitter time delay eliminates multiple interrupts for a transmitter FIFO "empty" condition that has already been indicated to the CPU. Programmable interrupt levels on the receiver FIFO, together with a receiver FIFO that continues to fill beyond the programmed interrupt level, allow adjustments for variable CPU latency times. A receiver time delay interrupt indicates to the CPU that there are data characters in the receiver FIFO which have not reached the programmable trigger level, but which exceed specified time limit conditions. The receiver and transmitter FIFOs may be both individually and simultaneously disabled; a single-bit register flag indicates their status.

10 Claims, 14 Drawing Sheets

FIG. 3.

| FIFO Mode Only | Interrupt Identification Register | | | Priority Level | Interrupt Set and Reset Functions | | |
|---|---|---|---|---|---|---|---|
| | Bit 3 | Bit 2 | Bit 1 | Bit 0 | | Interrupt Type | Interrupt Source | Interrupt Reset Control |
| 0 | 0 | 0 | 1 | — | None | None | — |
| 0 | 0 | 1 | 1 | 0 | Highest | Receiver Line Status | Overrun Error or Parity Error or Framing Error or Break Interrupt | Reading the Line Status Register |
| 0 | 0 | 1 | 0 | 0 | Second | Received Data Available | Receiver Data Available or Trigger Level Reached | Reading the Receiver Buffer Register or the FIFO Drops Below the Trigger Level |
| 1 | 1 | 0 | 0 | Second | Character Timeout Indication | No Characters Have Been Removed From or Input to the RCVR FIFO During the Last 4 Char. Times and There is at Least 1 Char. in It During This Time | Reading the Receiver Buffer Register |
| 0 | 0 | 0 | 1 | 0 | Third | Transmitter Holding Register Empty | Transmitter Holding Register Empty | Reading the IIR Register (if source of interrupt) or Writing into the Transmitter Holding Register |
| 0 | 0 | 0 | 0 | 0 | Fourth | MODEM Status | Clear to Send or Data Set Ready or Ring Indicator or Data Carrier Detect | Reading the MODEM Status Register |

FIG. 4.

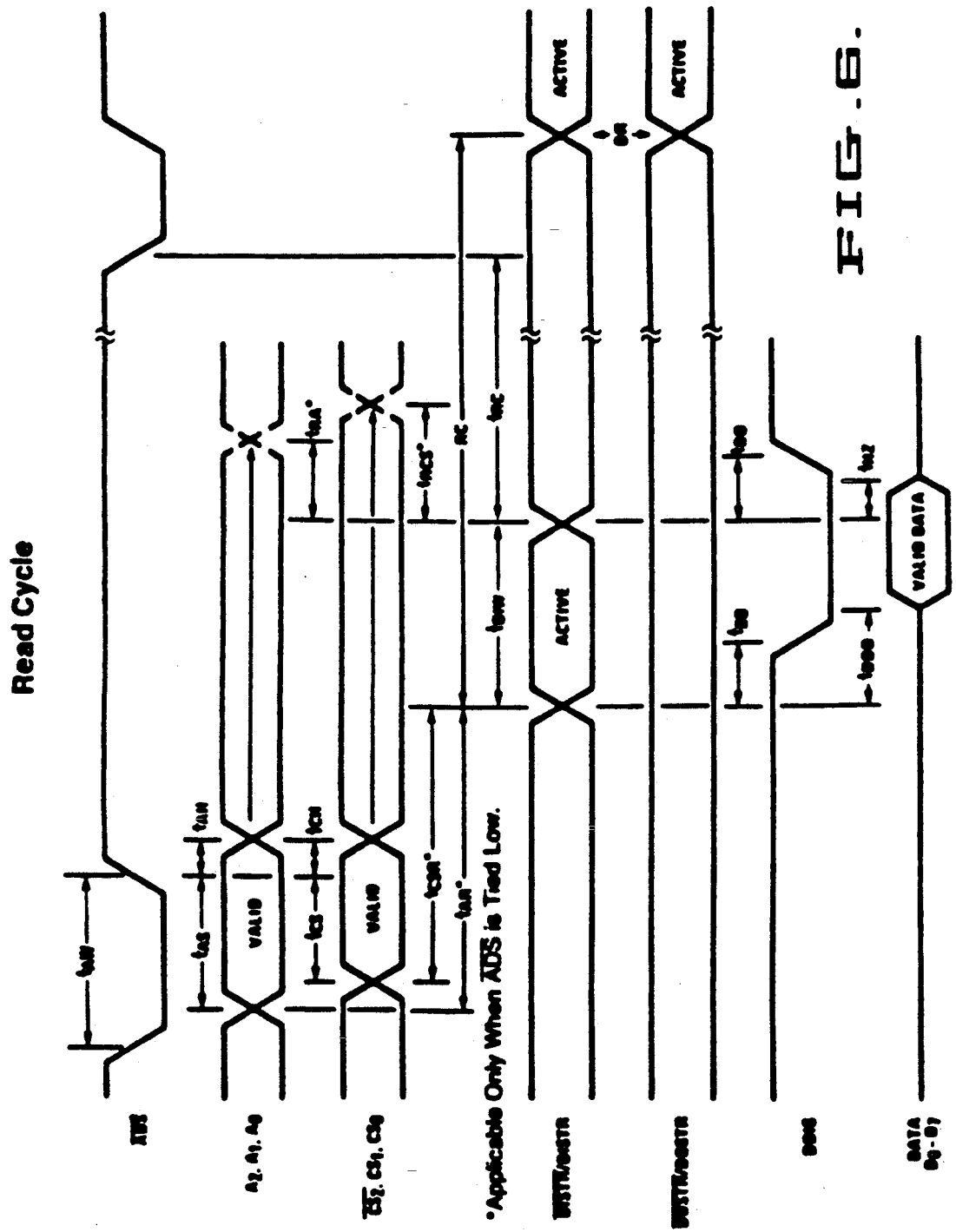

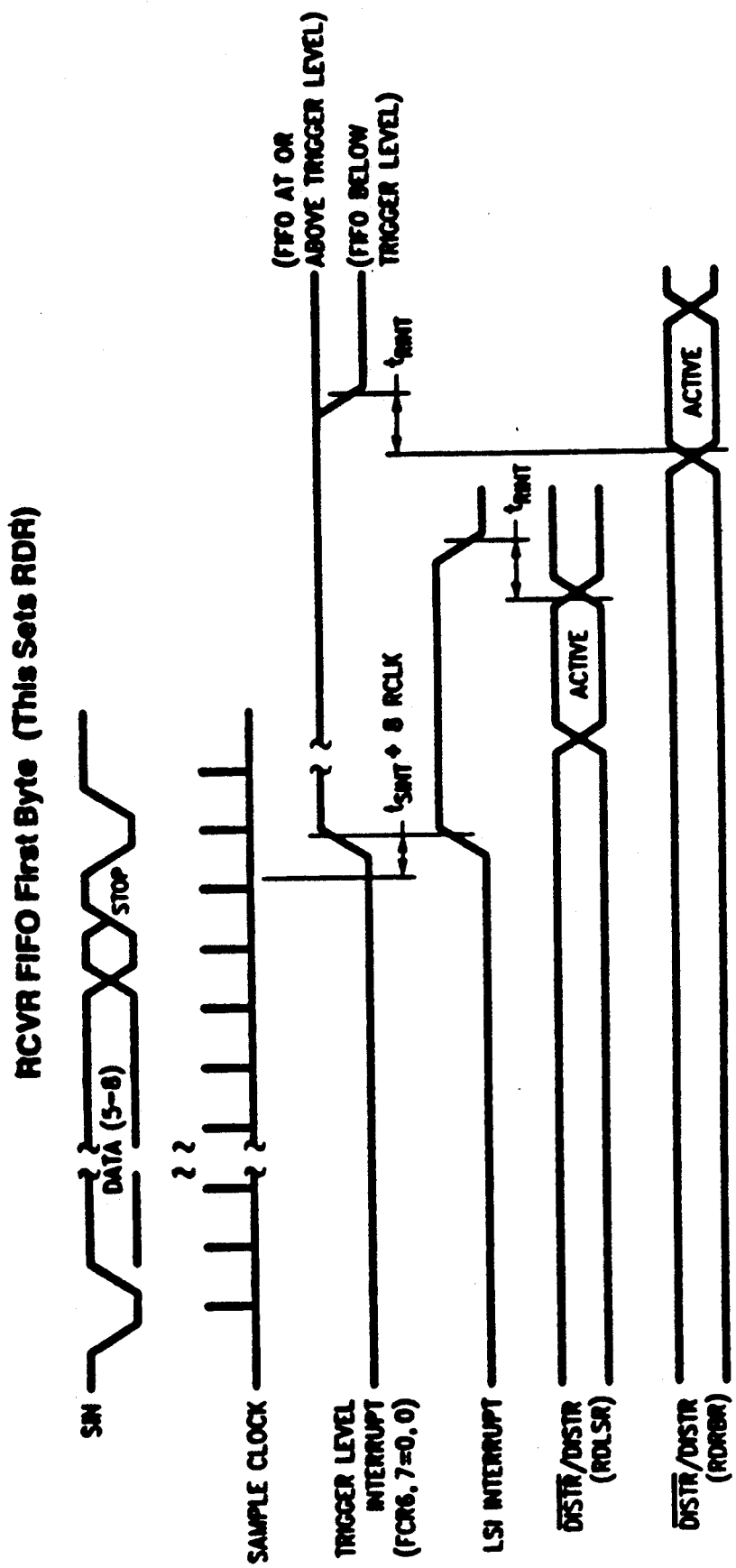
FIG_2

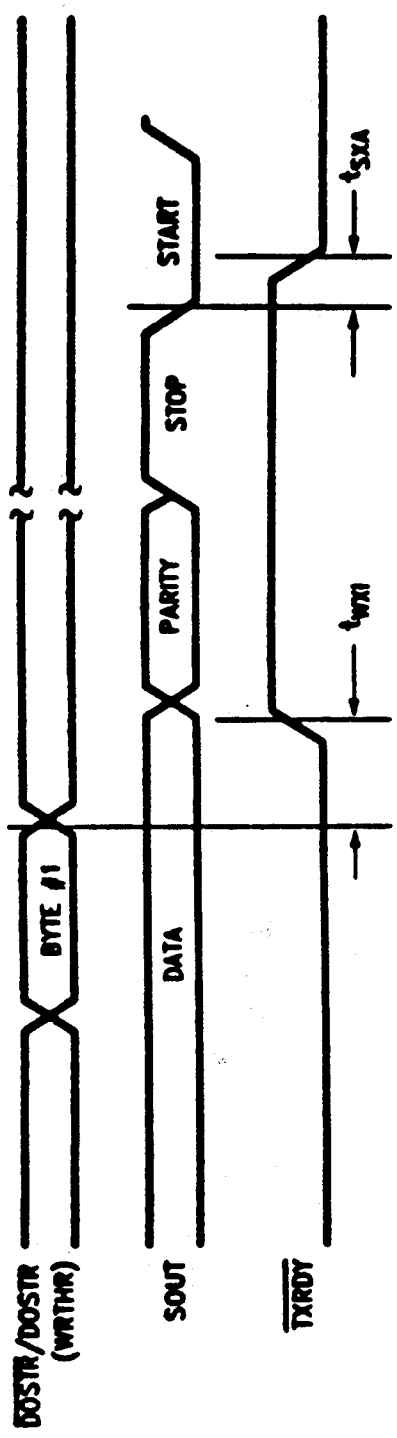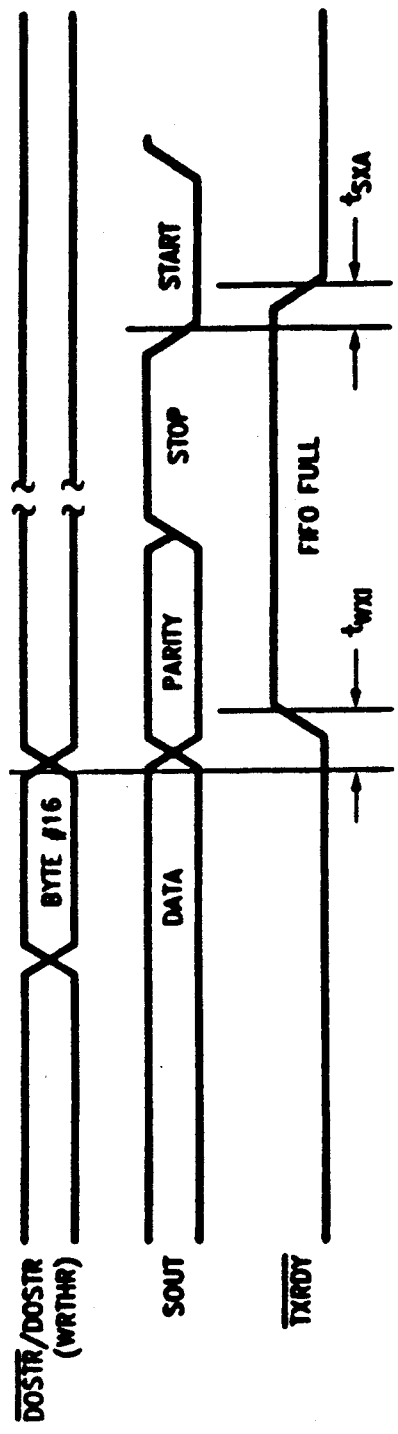
FIG. 8.

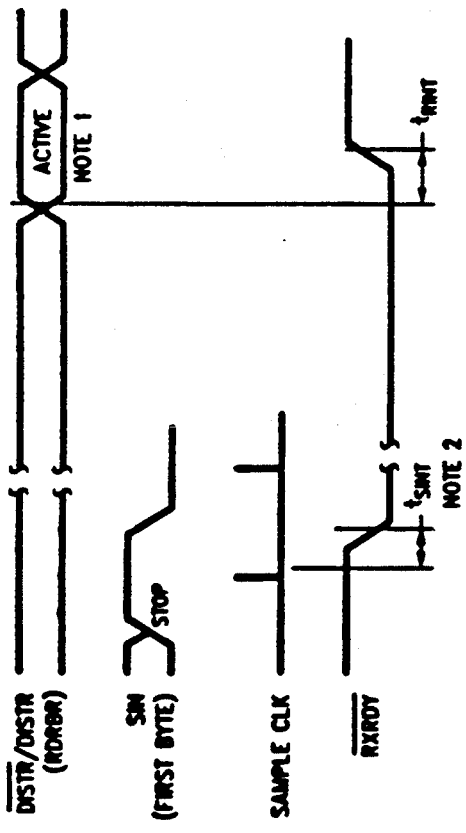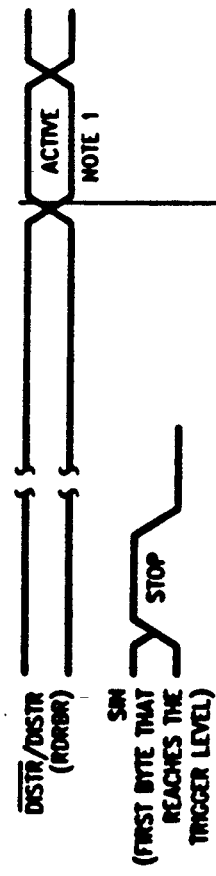
FIG. 9

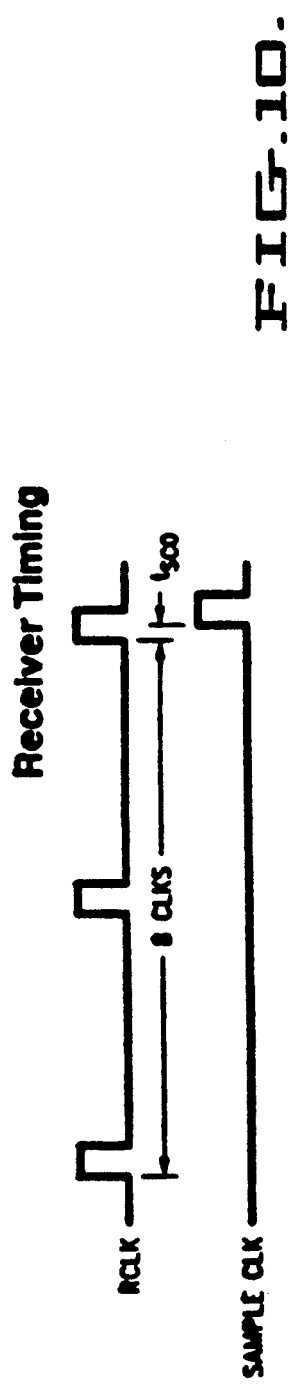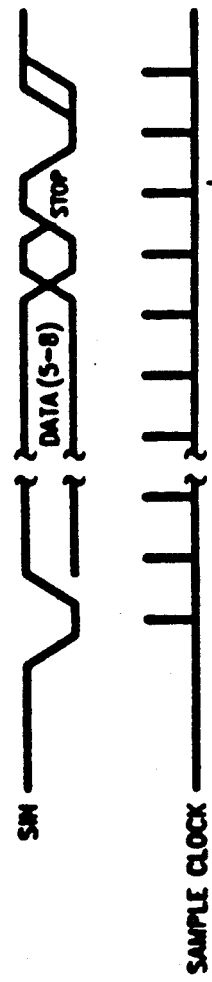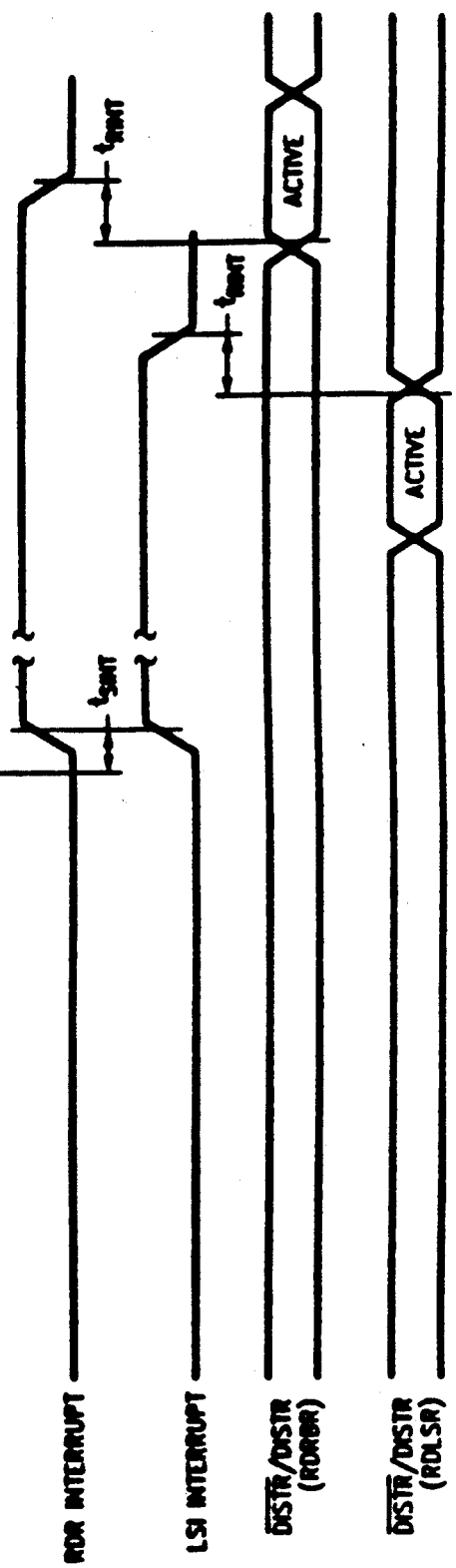
FIG. 10. Receiver Timing

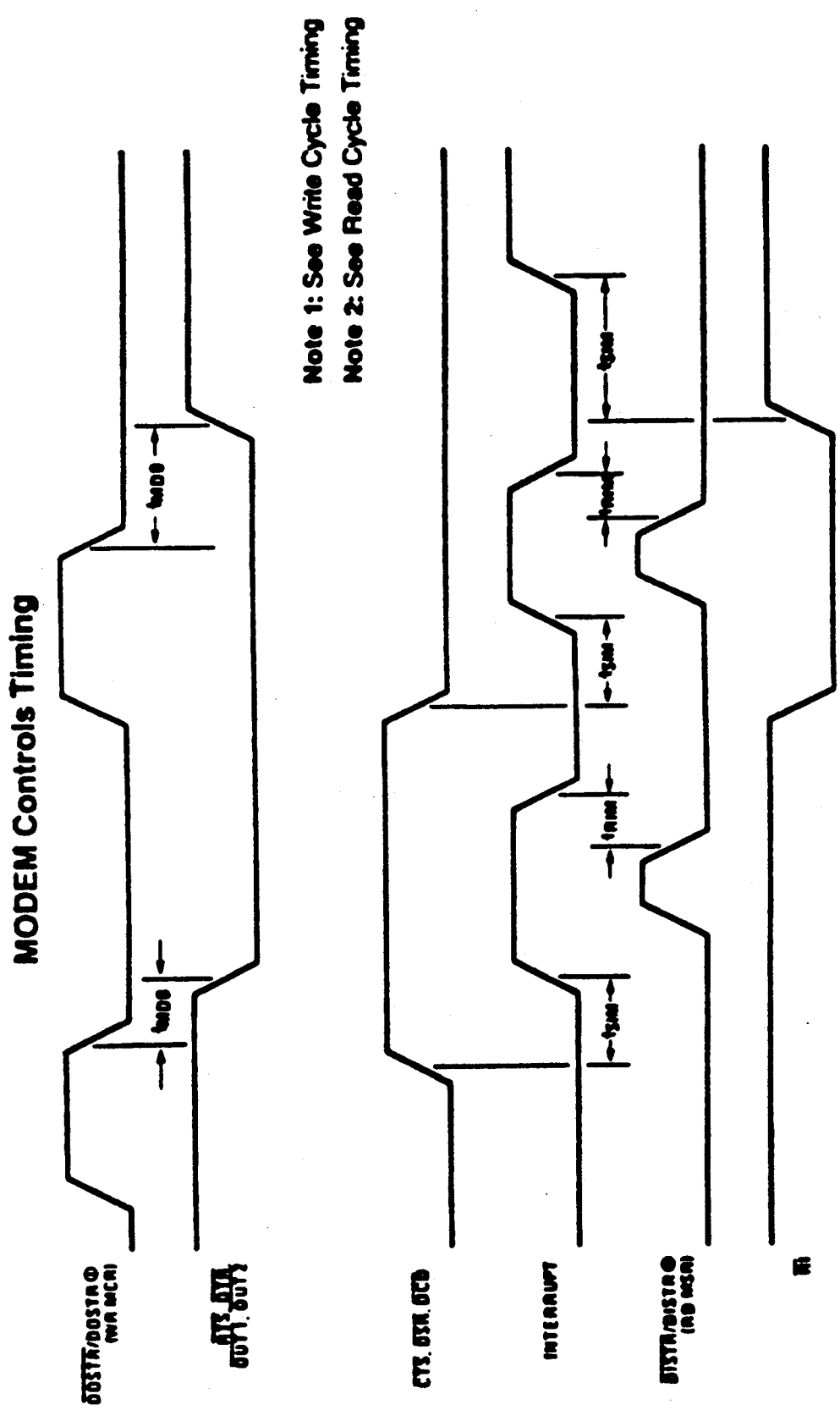

| AC Electrical Characteristics | $T_A = 0°C$ to $+70°C$, $V_{CC} = +5V \pm 5\%$ | | |
|---|---|---|---|
| Symbol | Parameter | Symbol | Parameter |
| $t_{AH}$ | Address Hold Time | Transmitter | |
| $t_{AR}$ | DISTR/DISTR Delay from Address | $t_{IR}$ | Delay from DOSTR/DOSTR (WR THR) to Reset Interrupt |
| $t_{AS}$ | Address Setup Time | $t_{IR}$ | Delay from DISTR/DISTR (RD IIR) to Reset Interrupt (THRE) |
| $t_{AW}$ | Address Strobe Width | | |
| $t_{CH}$ | Chip Select Hold Time | $t_{IRS}$ | Delay from Initial INTR Reset to Transmit Start |
| $t_{CS}$ | Chip Select Setup Time | | |
| $t_{CSR}$ | DISTR/DISTR Delay from Chip Select | $t_{SI}$ | Delay from Initial Write to Interrupt |
| $t_{CSW}$ | DOSTR/DOSTR Delay from Select | | |
| $t_{DD}$ | DISTR/DISTR to Driver Enable/Disable | $t_{STI}$ | Delay from Stop to Interrupt (THRE) |
| $t_{DDA}$ | DOSTR/DOSTR Delay from Address | | |
| $t_{DDD}$ | Delay from DISTR/DISTR to Data | $t_{SXA}$ | Delay from Start to TXRDY active |
| $t_{DH}$ | Data Hold Time | $t_{WXI}$ | Delay from Write to TXRDY inactive |
| $t_{DIW}$ | DISTR/DISTR Strobe Width | Modem Control | |
| $t_{DOW}$ | DOSTR/DOSTR Strobe Width | $t_{MDO}$ | Delay from DOSTR/DOSTR (WR MCR) to Output |
| $t_{DS}$ | Data Setup Time | | |
| $t_{HZ}$ | DISTR/DISTR to Floating Data Delay | $t_{RIM}$ | Delay to Reset Interrupt from DISTR/DISTR (RD MSR) |
| $t_{MRW}$ | Master Reset Pulse Width | | |
| $t_{RA}$ | Address Hold Time from DISTR/DISTR | $t_{SIM}$ | Delay to Set Interrupt from MODEM input |
| $t_{RC}$ | Read Cycle Delay | | |
| $t_{RCS}$ | Chip Select Hold Time from DISTR/DISTR | | |
| $t_{WA}$ | Address Hold Time from DOSTR/DOSTR | | |
| $t_{WC}$ | Write Cycle Delay | | |
| $t_{WCS}$ | Chip Select Hold Time from DOSTR/DOSTR | | |
| $t_{XH}$ | Duration of Clock High Pulse | | |
| $t_{XL}$ | Duration of Clock Low Pulse | | |
| RC | Read Cycle = $t_{AR} + t_{DIW} + t_{RC}$ | | |
| WC | Write Cycle = $t_{DDA} + t_{DOW} + t_{WC}$ | | |
| Baud Generator | | | |
| N | Baud Divisor | | |
| $t_{BHD}$ | Baud Output Positive Edge Delay | | |
| $t_{BLD}$ | Baud Output Negative Edge Delay | | |
| $t_{HW}$ | Baud Output Up Time | | |
| $t_{LW}$ | Baud Output Down Time | | |
| Receiver | | | |
| $t_{RINT}$ | Delay from DISTR/DISTR (RD RBR/RDLSR) to Reset Interrupt | | |
| $t_{SCD}$ | Delay from RCLK to Sample Time | | |
| $t_{SINT}$ | Delay from Stop to Set Interrupt | | |

FIG.13

BUFFERED ASYNCHRONOUS COMMUNICATIONS ELEMENTS WITH RECEIVE/TRANSMIT CONTROL AND STATUS REPORTING

This is a continuation of application Ser. No. 07/703,572, filed May 17, 1991, now U.S. Pat. No. 5,241,660, which is a continuation of application Ser. No. 07/462,841, filed Dec. 22, 1989, now abandoned, which is a continuation of application Ser. No. 07/295,610, filed Jan. 10, 1989, now abandoned, which is a divisional of application Ser. No. 06/924,797, filed Oct. 30, 1986, now U.S. Pat. No. 4,823,312.

BACKGROUND OF THE INVENTION

1. Field of the Invention

The present invention relates to data communications circuits and, in particular, to an asynchronous communications element which is operable in alternate modes for use with a variety of CPUs and peripherals.

2. Discussion of the Prior Art

Data communications is a broad term used to define the transmission of data from one point to another.

To ensure that two or more communications stations may coherently communicate data between one another, a protocol is established to define the characteristics of the communication link.

The most popular protocol for data transmission is asynchronous communication. This protocol specifies that each data character to be transmitted be proceeded by a "start" bit and be followed by one or more "stop" bits. Between characters, a mark condition is continuously maintained. Because each transmitted character is bracketed by these "start" and "stop" bits, the receiving station is resynchronized with each transmission, allowing unequal intervals between characters.

One commonly used asynchronous data communications device is the universal asynchronous receiver/transmitter, or UART. UARTs rely on two separate serial shift registers, each with its own serial port and clock, to receive data from and transmit data to a modem or peripheral device in response to control signals from an associated central processing unit. This architecture allows full duplex operation at different data rates.

To transmit data from its associated central processing unit to a selected modem or peripheral device, a UART can request the parallel transfer of data (typically an 8-bit character which is placed on the system's data bus by the central processing unit) into the UART's transmitter holding register The transmitter holding register then transfers the data to a transmitter shift register which serially transmits each bit of data to the peripheral device. Initially, when the transmitter holding register is empty, the UART signals the central processing unit that it is ready to receive data. Data is tranferred when a data strobe input to the UART is appropriately pulsed.

Since the transmitter holding register is "empty" as soon as the parallel transfer of data to the transmitter shift register occurs, even if the actual serial shifting of data by the shift register is not complete, the UART may indicate to the central processing unit that a new data character may be loaded to the holding register. When the new data is loaded into the holding register, if the serial transmitter shift register is not yet free, the data is held in the holding register until the serial shift of the initial data is completed. The transfer of the new data into the shift register is then allowed to take place.

Thus, a typical UART can retain a maximum of two data characters for transmission from its associated central processing unit. If the full transmission requires the transfer of more than two characters, the central processing unit, which can transfer data much faster than the UART's transmitter shift register, must either wait for the register to complete its serial transfer or go to different tasks and then respond to many interrupts from the UART to complete the transmission. Both alternatives are an extremely inefficient use of central processing unit time.

Receipt of data by the central processing unit from a modem or other peripheral device via the UART is subject to the same time inefficiencies as is data transmission. That is, the central processing unit is inhibited by the operating rate and data capacity of the UART. As in data transmission, to receive data, the UART utilizes a shift register and a holding register. A data character is shifted serially from the modem or peripheral device into a serial-to-parallel receiver shift register. When the entire character has been assembled in the shift register, it is transferred to a receiver holding register, freeing the receiver shift register to receive the next character. The UART indicates it has received data ready to be transferred to the CPU and places the data on the system bus for parallel transfer when the appropriate strobe is received by the central processing unit.

UARTs are available which utilize a first-in-first-out memory to replace the receiver shift register UARTs may be used either in an interrupt mode or in a polling configuration. In the interrupt mode, the UART sends an interrupt to the central processing unit which services it by either placing data on or retrieving data from the system bus. In the polling mode, the central processing unit periodically interrogates the UART to determine whether it is ready to send or whether it has received data.

SUMMARY OF THE INVENTION

It is a primary object of the present invention to provide an Asynchronous Communications Element which reduces the interrupt overhead of an associated central processing unit.

It is also an object of the present invention to provide an Asynchronous Communications Element which eliminates repetitious central processing unit interrupts for a data empty condition that has already been indicated to the central processing unit.

It is a further object of the present invention to provide a programmable Asynchronous Communications Element which is adjustable for variable central processing unit interrupt latency times.

It is yet a further object of the present invention to provide an Asynchronous Communications Element which can enable and disable multiple operating modes and can indicate its current operating mode.

These and other objects of the present invention are accomplished by providing an Asynchronous Communications Element which incorporates, in its preferred embodiment, two user-selectable 16-byte First-In-First-Out (FIFO) memories as transmitter and receiver buffers A transmitter time delay eliminates multiple interrupts for a transmitter FIFO "empty" condition that has already been indicated to an associated CPU. Programmable interrupt levels on the receiver FIFO, together with a receiver FIFO that continues to fill beyond the programmed interrupt level, allow adjustments for variable CPU interrupt latency times. The Asynchronous Communications Element of the present invention also includes a receiver time delayed interrupt for indicating to the CPU that there are data characters in the receiver FIFO which have not reached the programmable trigger level, but have exceeded the following time limit conditions: (1) there have been no further data characters received on the serial input line for a pre-determined period of time and (2) the CPU has not accessed the receiver FIFO during this pre-determined time period and this period also exceeds the predetermined time limit to access an active receiver FIFO. The Asynchronous Communications Element of the present invention also includes the capability of individually enabling or disabling the receiver FIFO and the transmitter FIFO and of indicating the state of the FIFOs using a single-bit register flag.

Other objects, features and advantages of the Asynchronous Communications Element of the present invention will become apparent and be appreciated by referring to the following detailed description of the invention considered in conjunction with the accompanying drawings.

DESCRIPTION OF THE DRAWINGS

FIG. 3 provides a table that summarizes the contents of the accessible registers of the Asynchronous Communications Element of the present invention.

FIG. 4 provides a table that summaries the interrupt control functions associated with the Asynchronous Communications Element of the present invention.

FIG. 6 is a timing diagram for the read cycle of the Asynchronous Communications Element of the present invention.

FIG. 8 is a timing diagram for the transmitter DMA pin of the Asynchronous Communications Element of the present invention.

FIG. 9 is a timing diagram for the receiver DMA pin of the Asynchronous Communications Element of the present invention.

FIG. 10 is a timing diagram for the receiver timing of the Asynchronous Communications Element of the present invention.

FIG. 12 is a timing diagram for the modem control timing of the Asynchronous Communications Element of the present invention.

FIG. 13 provides a table for associating timing diagram symbols with the corresponding parameter of the Asynchronous Communications Element of the present invention.

DETAILED DESCRIPTION OF THE PREFERRED EMBODIMENT

Figure 1:
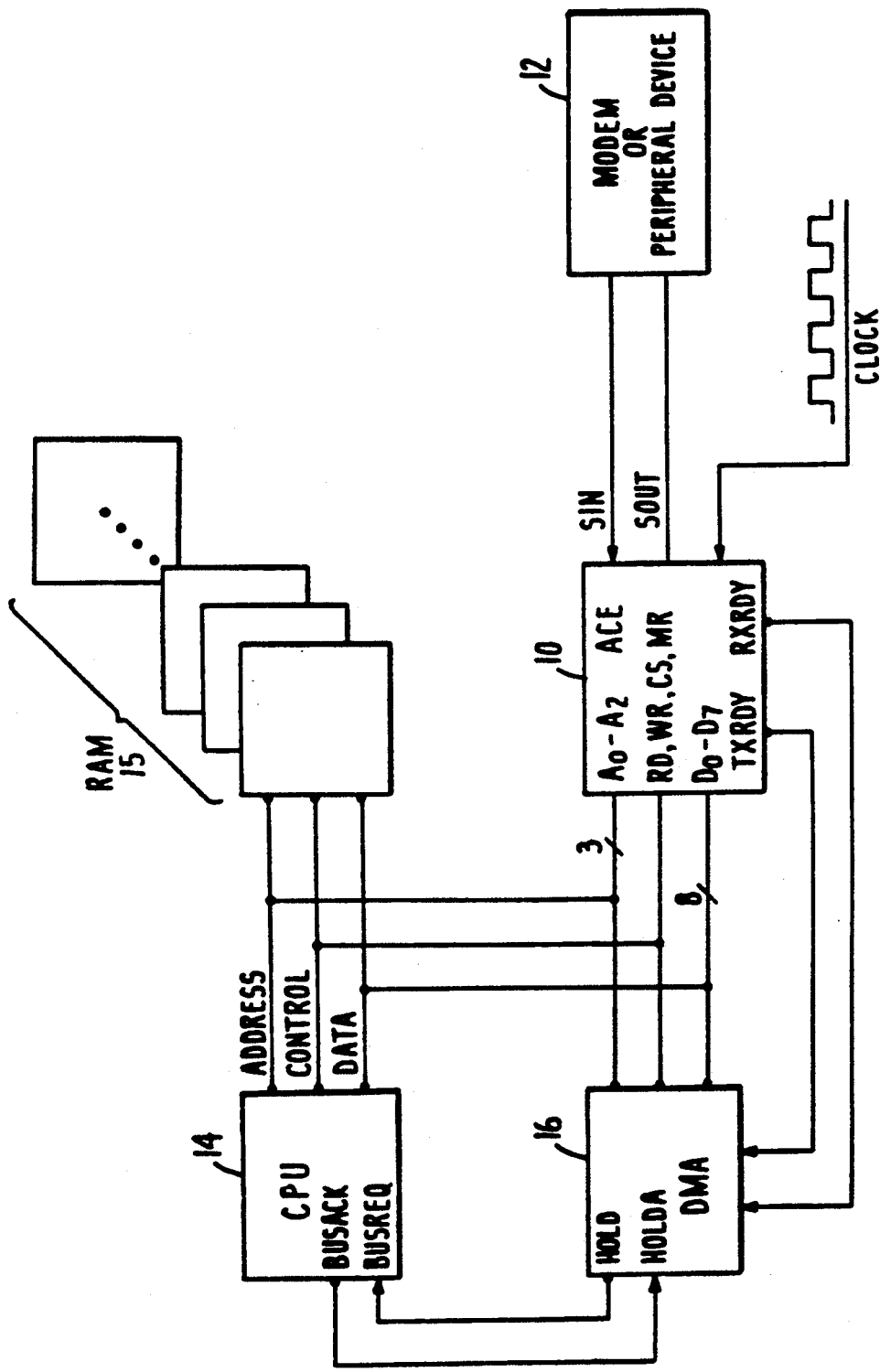
FIG. 1 is a schematic block diagram-illustrating an Asynchronous Communications Element in accordance with the present invention in a computing cluster.

FIG. 1 shows a data communications device, Asynchronous Communications Element 10, which performs parallel-to-serial conversion on digital data transmitted by a data processing system and serial-to-parallel conversion on digital data received from a communications station, such as a peripheral device or modem, which is external to the data processing system for transfer to the data processing system.

In the receipt of data from peripheral device 12, Asynchronous Communications Element 10, in response to control signals from CPU 14, which is part of the data processing system, converts a serial data bit stream into an 8-bit data character $D_0$-$D_7$. The 8-bit character $D_0$-$D_7$ is then placed on the system's data bus, read into an internal register of CPU 14 and then written into main memory 15. These steps are accomplished through the issuance of control commands by CPU 14, as described in greater detail below.

In the transmission of data characters to peripheral device 12, CPU 14 first retrieves the desired data from memory 15 and then provides it to Asynchronous Communications Element 10 as an 8-bit character. Asynchronous Communications Element 10 converts the character to a serial data bit stream and transmits it to peripheral device 12.

As further shown in FIG. 1, in the preferred embodiment, a direct memory access (DMA) unit 16 is utilized to bypass CPU 14 if desired. To invoke DMA 16, in response to a request TXRDY or RXRDY from Asynchronous Communications Element 10, DMA 16 issues a bus request signal BUSREQ to CPU 14 and, in return, receives a bus acknowledgement signal BUSACK. CPU 14 then relinquishes the data bus to DMA 16 for data transfer directly between Asynchronous Communications Element 10 and memory 15.

A clock signal provided to Asynchronous Communications Element 10 by a timing element (not shown) determines the rate at which serial data streams are clocked into or out of device 10. (Hereinafter the terms "Asynchronous Communications Element" and "device" will be used interchangeably.)

Figure 2:
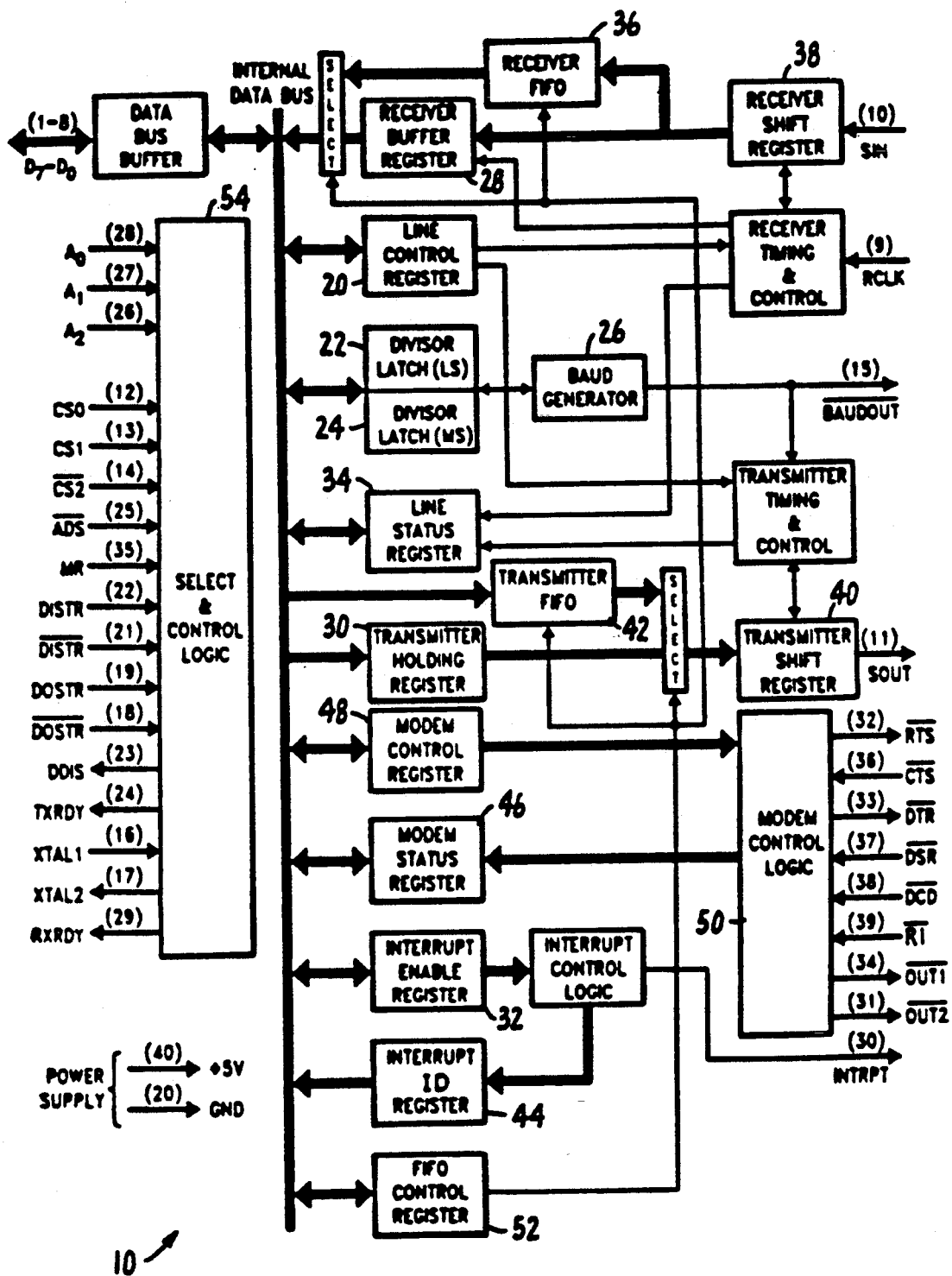
FIG. 2 is a schematic block diagram illustrating the structure of the Asynchronous Communications Element of the present invention.
Figure 5:
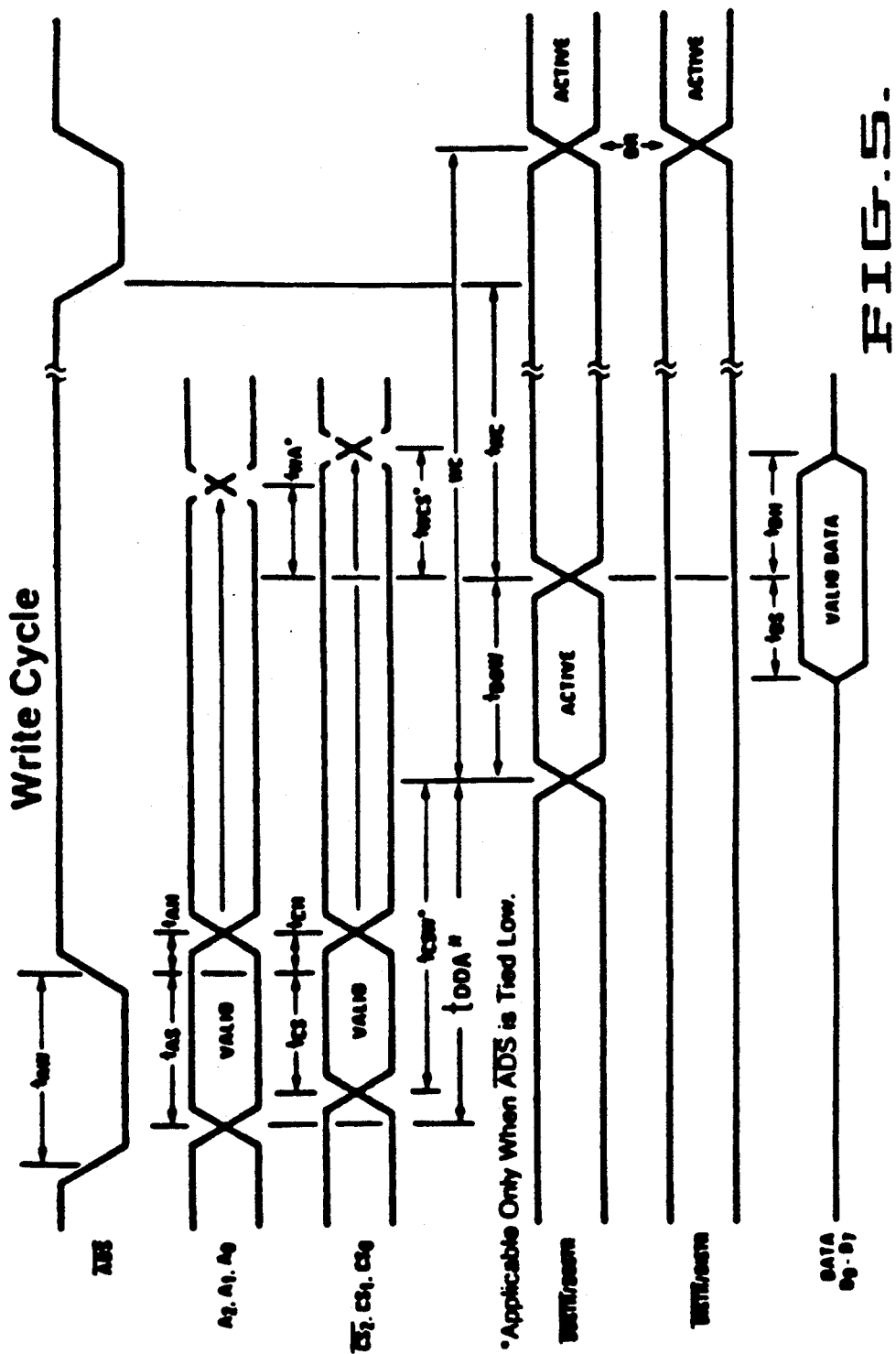
FIG. 5 is a timing diagram for the write cycle of the Asynchronous Communications Element of the present invention.
Figure 7:
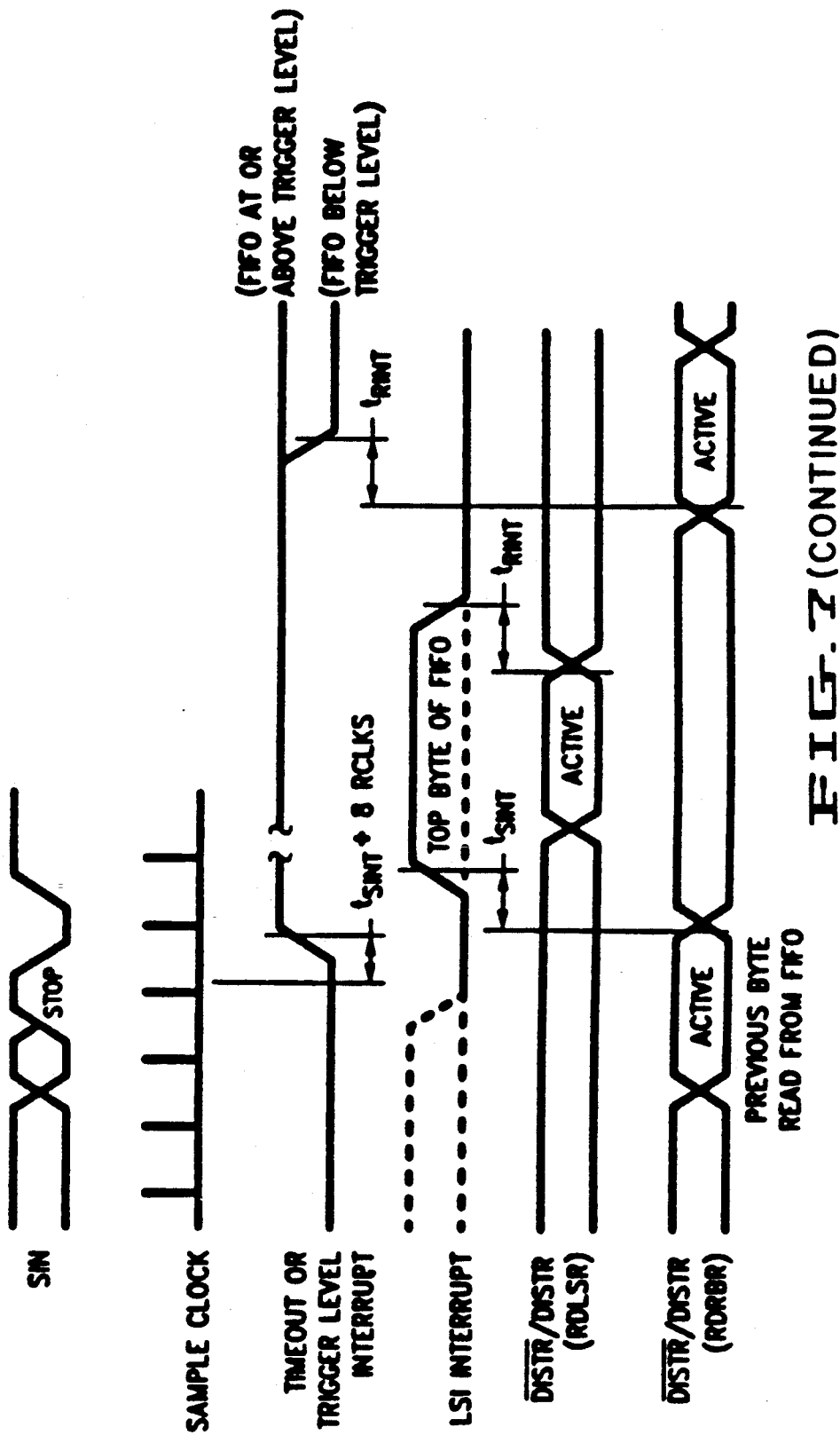
FIG. 7 is a timing diagram for the FIFO mode of operation of the Asynchronous Communications Element of the present invention.
Figure 11:
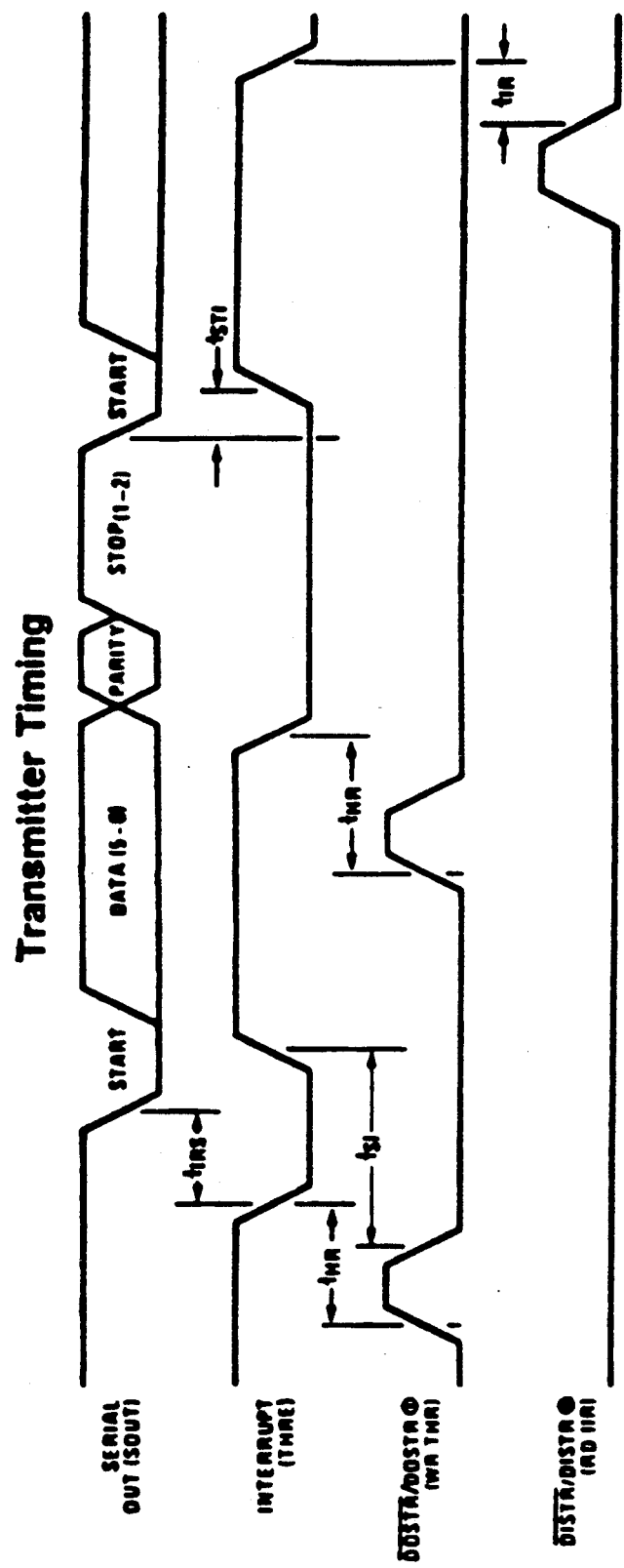
FIG. 11 is a timing diagram for the transmitter timing of the Asynchronous Communications Element of the present invention.

As shown in FIG. 2, a number of registers are used to control the flow of data through Asynchronous Communications Element 10. In the following detailed description of this register organization, a "low" represents a logic 0 (OV nominal) and a "high" represents a logic 1 (+2.4 V nominal).

The format of the asynchronous data exchange via Asynchronous Communication Element 10 is specified via a Line Control Register 20. In addition to controlling the communications format, Line Control Register 20 is also capable of providing its contents for inspection so that the operational mode of device 10 can be determined. This feature greatly simplifies system programming and eliminates the need for separate storage of the operating characteristics in main memory 15.

The contents of Line Control Register 20 are summarized in the table provided in FIG. 3, and are described in detail below (FIG. 3 sets forth a summary of the contents of all accessible registers of device 10.).

Bits 0 and 1 of Line Control Register 20 specify the number of bits in each transmitted or received serial data character. The encoding of bits 0 and 1 is as shown in Table I below.

TABLE I

| Bit 1 | Bit 0 | Character Length |
|---|---|---|
| 0 | 0 | 5 bits |
| 0 | 1 | 6 bits |
| 1 | 0 | 7 bits |
| 1 | 1 | 8 bits |

Bit 2 of Line Control Register 20 specifies the number of "Stop" bits in each transmitted character. If bit 2 is a logic 0, one Stop bit is generated in the transmitted data. If bit 2 is a logic 1 when a 5-bit character length is selected via bits 0 and 1, one and one-half Stop bits are generated. If bit 2 is a logic 1 when either a 6, 7, or 8-bit character length is selected, two Stop bits are generated. Receiver logic in Receiver Shift Register 38 checks the first Stop bit only, regardless of the number of Stop-bits selected.

Bit 3 of Line Control Register 20 is a Parity Enable bit. When bit 3 is a logic 1, a Parity bit is generated (transmitted data) or checked (received data) between the last data bit of a character and a Stop bit of the serial data. The Parity bit is used to produce an even or odd number of 1s when the character bits and the parity bit are summed for conventional error detection coding.

Bit 4 of Line Control Register 20 is an Even Parity Select bit. When bit 3 is a logic 1 and bit 4 is a logic 0, an odd number of logic 1s is transmitted or checked in the character bits and Parity bit. When bit 3 is a logic 1 and bit 4 is a logic 1, an even number of logic 1s is transmitted or checked.

Bit 5 of Line Control Register 20 is a Stick Parity bit. When bits 3, 4 and 5 are logic 1, the Parity bit is transmitted and checked as a logic 0. If bits 3 and 5 are logic 1 and bit 4 is a logic 0, then the Parity bit is transmitted and checked as logic 1.

Bit 6 of Line Control Register 20 is a Break Control bit. When it is set to a logic 1, the Serial Output (SOUT) is forced to the Spacing (logic 0) state. The break is disabled by setting bit 6 to a logic 0. The Break Control bit acts only on output SOUT and has no effect on the transmitter logic. This feature enables CPU 14 to alert a terminal in the computer communication system. If the following sequence is followed, no erroneous or extraneous characters will be transmitted because of the break: 1) load in all 0s, pad character, in response to a Transmitter Holding Register Empty indication THRE; 2) set break after the next THRE; and 3) wait for the transmitter to be idle, (TEMT=1), and clear break when normal transmission has to be restored. During the break, the transmitter can be used as a character timer to accurately establish the break duration.

Bit 7 of Line Control Register 20 is a Divisor Latch Access Bit (DLAB). It must be set to a logic 1 to access Divisor Latches 22 and 24 of Baud Generator 26 (each of which are discussed below) during a read or write operation. Bit 7 must be set to a logic 0 to access Receiver Buffer Register 28, Transmitter Holding Register 30, or Interrupt Enable Register 32.

Programmable Baud Generator 26 is capable of taking any clock input (DC to 8.0 MHz) and dividing by any divisor from 1 to $2^{16}-1$. The output frequency of Baud Generator 26 is 16× the baud [divisor # = (frequency input) ÷ (baud rate × 16)].

Two 8-bit Divisor Latches 22 and 24 store the divisor in a 16-bit binary format. Divisor Latches 22 and 24 must be loaded during initialization of Asynchronous Communications Element 10 to ensure desired operation of Baud Generator 26. Upon loading either of Divisor Latches 22 or 24, a 16-bit baud counter is immediately loaded. This prevents long counts on initial load.

Tables II, III, and IV below illustrate the use of Baud Generator 26 with crystal frequencies of 1.8432 MHz, 3.072 MHz and 8.0 MHz, respectively. For baud rates of 38,400 and below, the error obtained is minimal. The accuracy of the desired baud rate is dependent on the crystal frequency chosen.

TABLE II

| Desired Baud Rate | Divisor Used to Generate 16 x Clock | Percent Error Difference Between Desired and Actual |
|---|---|---|
| 50 | 2304 | — |
| 75 | 1536 | — |
| 110 | 1047 | 0.026 |
| 134.5 | 857 | 0.058 |
| 150 | 768 | — |
| 300 | 384 | — |
| 600 | 192 | — |
| 1200 | 96 | — |
| 1800 | 64 | — |
| 2000 | 58 | 0.69 |
| 2400 | 48 | — |
| 3600 | 32 | — |
| 4800 | 24 | — |
| 7200 | 16 | — |
| 9600 | 12 | — |
| 19200 | 6 | — |
| 38400 | 3 | — |
| 56000 | 2 | 2.86 |

TABLE III

| Desired Baud Rate | Divisor Used to Generate 16 x Clock | Percent Error Difference Between Desired and Actual |
|---|---|---|
| 50 | 3840 | — |
| 75 | 2560 | — |
| 110 | 1745 | 0.026 |
| 134.5 | 1428 | 0.034 |
| 150 | 1280 | — |
| 300 | 640 | — |
| 600 | 320 | — |
| 1200 | 160 | — |
| 1800 | 107 | 0.312 |
| 2000 | 96 | — |
| 2400 | 80 | — |
| 3600 | 53 | 0.628 |
| 4800 | 40 | — |
| 7200 | 27 | 1.23 |
| 9600 | 20 | — |
| 19200 | 10 | — |
| 38400 | 5 | — |

TABLE IV

| Desired Baud Rate | Divisor Used to Generate 16 x Clock | Percent Error Difference Between Desired and Actual |
|---|---|---|
| 50 | 10000 | — |
| 75 | 6667 | .005 |
| 110 | 4545 | .010 |
| 134.5 | 3717 | .013 |
| 150 | 3333 | .010 |
| 300 | 1667 | .020 |
| 600 | 833 | .040 |
| 1200 | 417 | .080 |
| 1800 | 277 | .080 |
| 2000 | 250 | — |
| 2400 | 208 | .160 |
| 3600 | 139 | .080 |
| 4800 | 104 | .160 |
| 7200 | 69 | .644 |
| 9600 | 52 | .160 |
| 19200 | 26 | .160 |
| 38400 | 13 | .160 |
| 56000 | 9 | .790 |

TABLE IV-continued

| Desired Baud Rate | Divisor Used to Generate 16 x Clock | Percent Error Difference Between Desired and Actual |
|---|---|---|
| 128000 | 4 | 2.344 |
| 256000 | 2 | 2.344 |

An 8-bit Line Status Register 34 provides status information to CPU 14 concerning the data transfer. The contents of Line Status Register 34 are summarized in FIG. 3 and are described below.

Bit 0 of Line Status Register 34 is a receiver Data Ready (DR) indicator. Bit 0 is set to a logic 1 whenever a complete incoming character has been received and transferred into Receiver Buffer Register 28 or Receiver FIFO 36. Bit 0 is reset to a logic 0 by reading all of the data in Receiver FIFO 36 or in Receiver Buffer Register 28.

Bit 1 of Line Status Register 34 is an Overrun Error (OE) indicator. Bit 1 indicates that data in Receiver Buffer Register 28 was not read by CPU 14 before the next character was transferred into Receiver Buffer Register 28, thereby destroying the previous character. The OE indicator is reset whenever CPU 14 reads the contents of Line Status Register 34. If FIFO mode data continues to fill Receiver FIFO 36 beyond the trigger level, an overrun error will occur only after Receiver FIFO 36 is full and the next character has been completely received in Receiver Shift Register 38. The OE signal is indicated to CPU 14 as soon as it happens. The character in Receiver Shift Register 38 is overwritten, but it does not corrupt Receiver FIFO 36.

Bit 2 of Line Status Register 34 is a Parity Error (PE) indicator. Bit 2 indicates that the received character does not have the correct even or odd parity, as selected by the Even-Parity-Select bit. The PE bit is set to a logic 1 upon detection of a parity error and is reset to a logic 0 whenever the CPU reads the contents of Line Status Register 34. In the FIFO mode, this error is associated with the particular character in Receiver FIFO 36 to which it applies. This error is revealed to CPU 14 when its associated character is at the top of Receiver FIFO 36.

Bit 3 of Line Status Register 34 is a Framing Error (FE) indicator. Bit 3 indicates that the received character did not have a valid Stop bit. Bit 3 is set to a logic 1 whenever the Stop bit following the last data bit or parity bit is detected as a 0 bit (Spacing level). The FE indicator is reset whenever CPU 14 reads the contents of the Line Status indicator. Again, in the FIFO mode, this error is associated with the particular character in the FIFO to which it applies and the error is revealed to CPU 14 when its associated character is at the top of that FIFO.

Bit 4 of Line Status Register 34 is a Break Interrupt (BI) indicator. Bit 4 is set to a logic 1 whenever a received character is held in the Spacing (logic 0) state for longer than a full character transmission time, that is, the total time of Start bit + Data bits + Parity + Stop bits. The BI indicator is reset whenever CPU 14 reads the contents of the Line Status indicator. As with bits 2 and 3 of Line Status Register 34, in the FIFO mode, this error is associated with the particular character in Receiver FIFO 36 to which it applies and is revealed to CPU 14 when its associated character is at the top of Receiver FIFO 36. When break occurs, only one 0 character is loaded into Receiver FIFO 36. The next character is loaded upon receipt of the next valid Start bit.

Thus, bits 1 through 4 of Line Status Register 34 are the error conditions that produce a Receiver Line Status interrupt whenever any of the corresponding conditions are detected.

Bit 5 of Line Status Register 34 is a Transmitter Holding Register Empty (THRE) indicator. Bit 5 indicates that Asynchronous Communications Element 10 is ready to accept a new data character for transmission. In addition, this bit causes device 10 to issue an interrupt to CPU 14 when the Transmitter Holding Register Empty interrupt enable is set high. The THRE bit is set to a logic 1 when a data character is transferred from Transmitter Holding Register 30 into Transmitter Shift Register 40. The bit is reset to logic 0 concurrently at the loading of Transmitter Holding Register 30 by CPU 14. In the FIFO mode, this bit is set when Transmitter FIFO 42 is empty; it is cleared when at least one character is written to Transmitter FIFO 42.

Bit 6 of Line Status Register 34 is a Transmitter Empty (TEMT) indicator. Bit 6 is set to a logic 1 whenever Transmitter Holding Register 30 and Transmitter Shift Register 40 are both empty. It is reset to a logic 0 whenever either Transmitter Holding Register 30 or the Transmitter Shift Register 40 contains a data character In the FIFO mode, bit 6 is set to 1 whenever Transmitter FIFO 42 and Transmitter Shift Register 40 are both empty.

Bit 7 of Line Status Register 34 is set to logic 1 if there is at least one parity error, framing error or break indication in Receiver FIFO 42. Bit 7 is cleared to logic 0 when CPU 14 reads the bit, if there are no subsequent errors in Receiver FIFO 42.

Thus, Line Status Register 34 is intended for read operations only. Writing to this register is not recommended, since this operation is strictly for testing.

An Interrupt Identification Register 44 provides on-chip interrupt capability that allows for flexibility in interfacing a number of presently available central processing units. In order to provide minimum software overhead during data transfers, the Asynchronous Communications Element 10 of the present invention prioritizes interrupts into four levels of interrupt conditions as follows: Receiver Line Status (priority 1); Received Data Ready (priority 2); Transmitter Holding Register Empty (priority 3); and Modem Status (priority 4).

Information indicating that a prioritized interrupt is pending, and the type of interrupt, are stored in Interrupt Identification Register 44. When addressed during chip-select, Interrupt Identification Register 44 freezes the highest priority interrupt pending and no other interrupts change the state of Interrupt Identification Register 44, even though they are recorded, until a particular interrupt is serviced by CPU 14.

Figure 3:
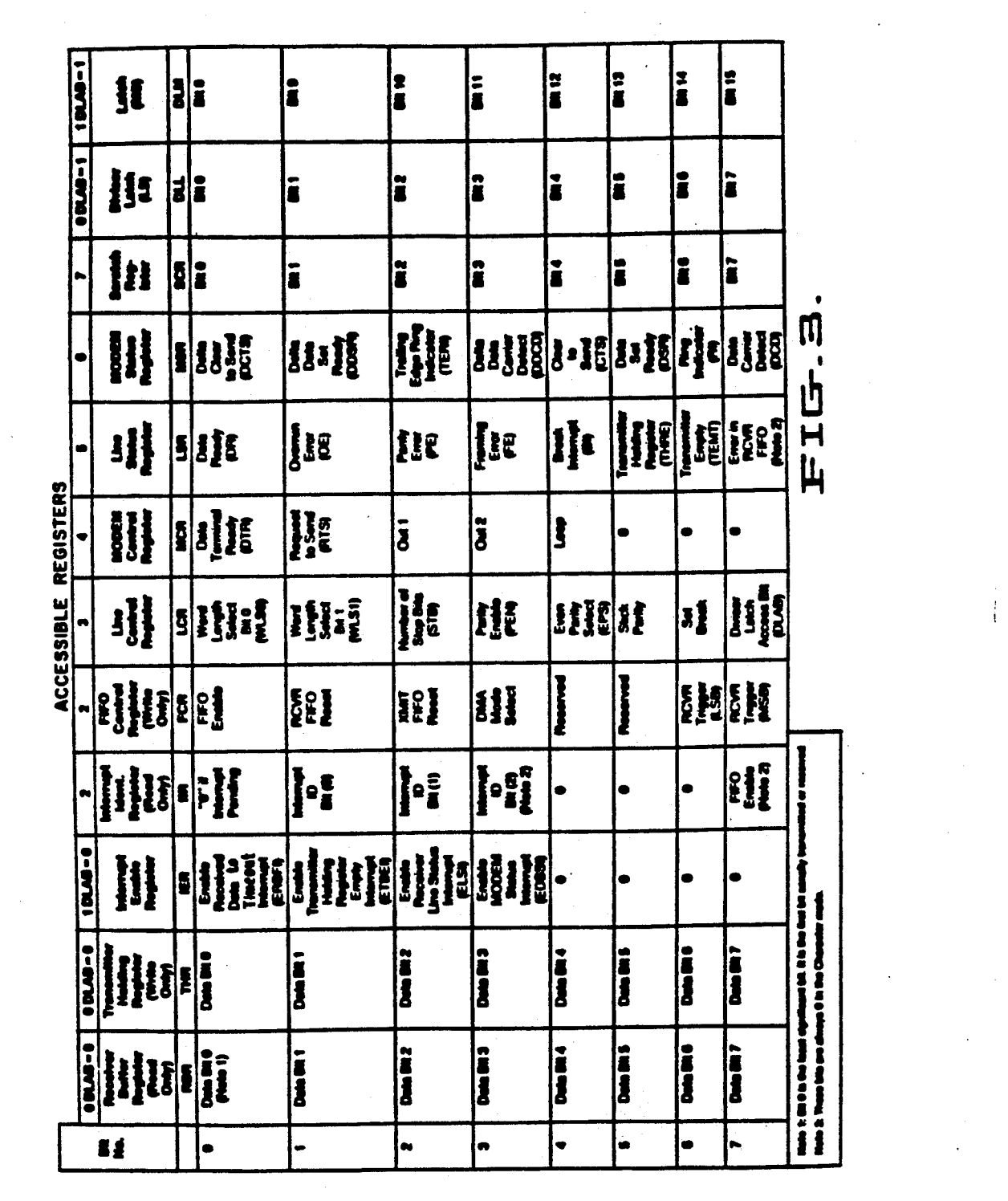

The contents of Interrupt Identification Register 44 are indicated in FIG. 3 and are described below.

Bit 0 of Interrupt Identification Register 44 can be used in either a hard-wired prioritized or polled environment to indicated whether an interrupt is pending. When bit 0 is a logic 0, an interrupt is pending and the contents of Interrupt Identification Register 44 may be used as a pointer to the appropriate interrupt service routine. When bit 0 is a logic 1, no interrupt is pending and polling, if used, continues.

Bits 1 and 2 of Interrupt Identification Register 44 are used to identify the high priority interrupt pending, as indicated in the table provided in FIG. 4.

In the FIFO mode, bit 3 of Interrupt Identification Register 44 is set along with bit 2 to indicate that a timeout interrupt is pending.

Bits 4 through 6 of Interrupt Identification Register 44 are always logic 0.

Bit 7 of Interrupt Identification Register 44 is set high when, as described below, bit 0 of FIFO Control Register 52 is set to 1, enabling both Receiver FIFO 36 and Transmitter FIFO 42. That is, Asynchronous Communications Element 10 is capable of enabling and disabling its dual FIFOs and of indicating the state of the FIFOs via a single-bit register flag.

An 8-bit Interrupt Enable Register 32 enables the four types of interrupts listed above to separately activate the interrupt (INTRPT) output signal of device 10. It is possible to totally disable the interrupt system by resetting bits 0 through 3 of Interrupt Enable Register 32. Similarly, by setting the appropriate bits of Interrupt Enable Register 32 to a logic 1, selected interrupts can be enabled. Disabling the interrupt system inhibits Interrupt Identification Register 44 and the active (high) INTRPT output from device 10. All other system functions operate in their normal manner, including the setting of Line Status Register 34 and Modem Status Register 46.

The contents of Interrupt Enable Register 32 are summarized in FIG. 3 and are described below.

Bit 0 of Interrupt Enable Register 32 enables the Received Data Available interrupt and the FIFO Mode Character timeout indicator when set to logic 1.

Bit 1 of Interrupt Enable Register 32 enables the Transmitting Holding Register Empty interrupt when set to logic 1.

Bit 2 of Interrupt Enable Register 32 enables the Receiver Line Status interrupt when set to logic 1.

Bit 3 of Interrupt Enable Register 32 enables the Modem Status interrupt when set to logic 1.

Bits 4 through 7 of Interrupt Enable Register 32 are always logic 0.

An 8-bit Modem Control Register 48 controls the interface with modem or peripheral device 12. The contents of Modem Control Register 48 are summarized in FIG. 3 and are described below.

Bit 0 of Modem Control Register 48 controls the Data Terminal Ready ($\overline{DTR}$) output. When bit 0 is set to a logic 1, the $\overline{DTR}$ output is forced to a logic 0. When bit 0 is reset to a logic 0, the $\overline{DTR}$ output is forced to a logic 1. The $\overline{DTR}$ output may be applied to an EIA inverting line to obtain the proper polarity input at the succeeding modem or peripheral 12.

Bit 1 of Modem Control Register 48 controls the Request to Send ($\overline{RTS}$) output. Bit 1 affects the $\overline{RTS}$ output in a manner identical to that described above for bit 0.

Bit 2 of Modem Control Register 48 controls the Output 1 ($\overline{OUT\ 1}$) signal, which is also an auxiliary user-designated output. Bit 2 affects the $\overline{OUT\ 1}$ output in the manner identical to that described above for bit 0.

Bit 3 of Modem Control Register 48 controls the output 2 ($\overline{OUT\ 2}$) signal which is an auxiliary user-designated output. Bit 3 effects the $\overline{OUT\ 2}$ output in a manner identical to that described above for bit 0.

Bit 4 of Modem Control Register 48 provides a local loopback feature for diagnostic testing of Asynchronous Communication Element 10. When bit 4 is set to logic 1, the following events occur: Transmitter Shift Register 40 Serial Output (SOUT) is set to the Marking (logic 1) state; Receiver Shift Register 38 Serial Input (SIN) is disconnected; the output of Transmitter Shift Register 40 is "looped back" into the input of Receiver Shift Register 38; the four inputs ($\overline{CTS}$, $\overline{DSR}$, $\overline{RI}$ and $\overline{DCD}$) to Modem Control Logic 50 are disconnected; the four outputs ($\overline{DTR}$, $\overline{RTS}$, $\overline{OUT\ 1}$, and $\overline{OUT\ 2}$) of Modem Control Logic 50 are internally connected to the four modem control inputs; and the modem control outputs are forced to their inactive state (high). In the diagnostic mode, data that is transmitted is immediately received. This feature allows CPU 14 to verify the transmit- and received- data paths of Asynchronous Communications Element 10.

In the diagnostic mode, the receiver and transmitter interrupts are fully operational. The Modem Control interrupts are also operational, but the interrupts' sources are now the lower four bits of Modem Control Register 48 instead of the four modem control inputs. Interrupts are still controlled by Interrupt Enable Register 32.

Bits 5 through 7 of Modem Control Register 48 are permanently set to logic 0.

An 8-bit Modem Status Register 46 provides the current state of the control line from modem or peripheral device 12 to CPU 14. In addition to this current-state information, four bits of Modem Status Register 46 provide change information. These bits are set to logic 1 whenever a control input from the modem or peripheral 12 changes state. They are reset to logic 0 whenever CPU 14 reads Modem Status Register 46.

The contents of Modem Status Register 46 are summarized in FIG. 3 and are described below.

Bit 0 of Modem Status Register 46 is the Delta Clear to Send (DCTS) indicator. Bit 0 indicates that the $\overline{CTS}$ input to device 10 has changed state since the last time it was read by CPU 14.

Bit 1 of Modem Status Register 46 is the Delta Data Set Ready (DDSR) indicator. Bit 1 indicates that the $\overline{DSR}$ input to device 10 has changed state since the last time it was read by CPU 14.

Bit 2 of Modem Status Register 46 is the Trailing Edge of Ring Indicator (TERI) detector. Bit 2 indicates that the $\overline{RI}$ input to device 10 has changed from a low to a high state.

Bit 3 of Modem Status Register 46 is the Delta Data Carrier Detect (DDCD) indicator. Bit 3 indicates that the $\overline{DCD}$ input to device 10 has changed state.

Thus, whenever bit 0, 1, 2, or 3 of Modem Status Register 46 is set to logic 1, a Modem Status interrupt is generated.

Bit 4 of Modem Status Register 46 is the complement of the Clear to Send ($\overline{CTS}$) input. If bit 4 of Modem Control Register 48 is set to a logic 1, then bit 4 of Modem Status Register 46 is equivalent to RTS in Modem Control Register 48.

Bit 5 of Modem Status Register 46 is the complement of the Data Set Ready ($\overline{DSR}$) input. If bit 4 of Modem Control Register 48 is set to a logic 1, then bit 5 of Modem Status Register 46 is equivalent to DTR in Modem Control Register 48.

Bit 6 of Modem Status Register 48 is the complement of the Ring Indicator ($\overline{RI}$) input. If bit 4 of Modem Control Register 48 is set to logic 1, then bit 6 of Modem Status Register 46 is equivalent to OUT 1 of Modem Control Register 48.

Bit 7 of Modem Status Register 46 is the complement of the Data Carrier Detect ($\overline{DCD}$) input. If bit 4 of Modem Control Register 48 is set to a logic 1, then bit 7 of Modem Status Register 46 is equivalent to OUT 2 of Modem Control Register 48.

FIFO Control Register 52 is a write only register at the same location as Interrupt Identification Register 44, since Interrupt Identification Register 44 is a read only register. FIFO Control Register 52 is used to enable both 16-byte Receiver FIFO 36 and 16-byte Transmitter FIFO 42, to clear both FIFOs, to set the trigger level of Receiver FIFO 36 and to select the type of DMA 16 signaling.

Writing a logic 1 to bit 0 of FIFO Control Register 52 enables both Receiver FIFO 36 and Transmitter FIFO 42. Resetting bit 0 clears all characters in both FIFOs. When changing from the Character mode to FIFO mode and vice versa, data will be automatically cleared from the two FIFOs 36 and 42, but not from their shift registers 38 and 40, respectively. Bit 0 must be a logic 1 when other bits of FIFO Control Register 52 are programmed or they will be ignored.

Writing a logic 1 to bit 1 of FIFO Control Register 52 clears all characters in Receiver FIFO 36 and resets the logic to the FIFO idle state.

Writing a 1 to bit 2 of FIFO Control Register 52 clears all characters in Transmitter FIFO 42 and resets the logic to the FIFO idle state.

Setting bit 3 of FIFO Control Register 52 to a logic 1 will cause the DMA pins to change from DMA Mode 0 to DMA Mode 1 if bit 0 of FIFO Control Register 52 is a logic 1.

Bits 4 and 5 of FIFO Control Register 52 are reserved and are set at 0.

Bits and 6 and 7 of FIFO Control Register 52 are used to indicate the trigger level for Receiver FIFO 36 interrupt. These programmable interrupt levels on Receiver FIFO 36 coupled with the fact that Receiver FIFO 36 continues to fill beyond the programmed interrupt level, up to a maximum of 16 characters, allows the Asynchronous Communications Element 10 to be adjusted for variable CPU interrupt latency times.

The following discussion describes the function of all input and output signals of Asynchronous Communications Element 10.

The device 10 utilizes three chip select input signals CS0, CS1 and $\overline{CS2}$.

When the CS0 and CS1 inputs are high and the $\overline{CS2}$ input is low, device 10 is selected. This enables communications between Asynchronous Communications Element 10 and CPU 14.

Device 10 utilizes two Data Input Strobe input signals DISTR and $\overline{DISTR}$.

When the DISTR is high or $\overline{DISTR}$ is low while the device is selected, it allows CPU 14 to read status information or data from a selected device 10 register. Only an active DISTR or $\overline{DISTR}$ input is required to transfer data from device 10 during a read operation. Therefore, if either the DISTR input or the $\overline{DISTR}$ input is not used, it is tied permanently low or permanently high, respectively.

The device utilizes two Data Output Strobe input signals DOSTR and $\overline{DOSTR}$. When DOSTR is high or $\overline{DOSTR}$ is low while device 10 is selected, it allows CPU 14 to write data or control characters into a selected device 10 register. Only an active DOSTR or $\overline{DOSTR}$ input is required to transfer data to device 10 during a write operation. Therefore, if either the DOSTR input or the $\overline{DOSTR}$ input is not used, it is tied permanently low or permanently high, respectively.

When low, an Address Strobe $\overline{ADS}$ input signal provides latching for Register Select (A0, A1, A2) and Chip Select (CS0, CS1, $\overline{CS2}$) signals. An active $\overline{ADS}$ input is required when the Register Select (A0, A1, A2) signals are not stable for the duration of a read or write operation. If not required, the $\overline{ADS}$ input is tied permanently low.

The three Register Select A0, A1, A2 inputs are used during a read or write operation to select a device 10 register to read from or write into as indicated in Table V below. Note that the state of the Divisor Latch Access Bit DLAB, which is the most significant bit of Line Control Register 20, effects the selection of certain device registers. The DLAB bit must be set high by the system's software to access Divisor Latches 22 and 24.

TABLE V

| DLAB | A₂ | A₁ | A₀ | Register |
|---|---|---|---|---|
| 0 | 0 | 0 | 0 | Receiver Buffer (read), Transmitter Holding Register (write) |
| 0 | 0 | 0 | 1 | Interrupt Enable |
| X | 0 | 1 | 0 | Interrupt Identification (read) |
| X | 0 | 1 | 0 | FIFO Control (write) |
| X | 0 | 1 | 1 | Line Control |
| X | 1 | 0 | 0 | MODEM Control |
| X | 1 | 0 | 1 | Line Status |
| X | 1 | 1 | 0 | MODEM Status |
| X | 1 | 1 | 1 | Scratch |
| 1 | 0 | 0 | 0 | Divisor Latch (least significant byte) |
| 1 | 0 | 0 | 1 | Divisor Latch (most significant byte) |

Receiver and transmitter DMA signalling is available through RCVR DMA and XMIT DMA input signals, respectively. When operating in the FIFO mode, one of two types of DMA signalling per each of these inputs can be selected via bit 3 of FIFO Control Register 52 as follows. In the Character mode, only one type of DMA transfer is allowed—mode 0. When bit 3 of FIFO Control Register 52 equals 0 and there is at least one character in Receiver FIFO 36 or Receiver Buffer Register 28 (Character mode), the RCVR DMA signal will be low active. Once it is activated, the RCVR DMA signal will go inactive when there are no more characters in Receiver FIFO 36 or Receiver Buffer Register 28 (Character mode). When the third bit of FIFO Control Register equals 1 and the trigger level or the timeout has been reached, the RCVR DMA signal will go low active. Once it is activated, it will go inactive when there are no more characters in Receiver FIFO 36. When the third bit of FIFO Control Register 52 equals 0 and there are no characters in Transmitter FIFO 42 or Transmitter Buffer Register 30 (Character mode), the XMIT DMA signal will be low active. Once it is activated, the XMIT DMA signal will go inactive after the first character is loaded into Transmitter FIFO 42 or Transmitter Buffer Register 30 (Character mode). When the third bit of FIFO Control Register 52 equals 1 and there is at least one unfilled position in Transmitter FIFO 42, it will go low active. The XMIT DMA signal will become inactive when Transmitter FIFO 42 is completely full.

The Master Reset (MR) input is buffered with a TTL-compatible Schmitt Trigger with a 0.5 V typical hysteresis. When high, the MR input clears all the registers and FIFOs (except the Receiver Buffer Register 28, Transmitter Buffer Register 30 and Divisor Latches 22 and 24), and Select and Control Logic 54. Also, the state of various output signals (SOUT, INTRPT, $\overline{OUT\ 1}$, $\overline{OUT\ 2}$, $\overline{RTS}$, $\overline{DTR}$) is affected by an active MR input.

The Receiver Clock RCLK input signal is a 16× baud rate clock for the receiver section of device 10.

The Serial Input SIN signal is the serial data input of the communications link (peripheral device, modem or data set).

The Clear To Send $\overline{CTS}$ input signal is a control function input whose conditions can be tested by the CPU by reading bit 4 (CTS) of Modem Status Register 46. Bit 0 (DCTS) of Modem Status Register indicates whether the $\overline{CTS}$ input has changed state since the previous reading of Modem Status Register 46. The $\overline{CTS}$ input has no affect on the transmitter. Whenever the CTS bit of Modem Status Register 46 changes state, an interrupt is generated if the Modem Status interrupt is enabled.

The Data Set Ready $\overline{DSR}$ input, when low, indicates that modem or peripheral 12 is ready to establish the communication link and transfer data with the Asynchronous Communications Element 10. The $\overline{DSR}$ signal is a modem-control function input whose condition can be tested by CPU 14 by reading bit 5 (DSR) of Modem Status Register 46. Bit 1 (DDSR) of Modem Status Register 46 indicates whether the $\overline{DSR}$ input has changed state since the previous reading of Modem Status Register 46. Whenever the DSR bit of Modem Status Register 46 changes state, an interrupt is generated if the Modem Status interrupt is enabled.

The Data Carrier Detect $\overline{DCD}$ signal, when low, indicates that the data carrier has been detected by modem or peripheral 12. The $\overline{DCD}$ signal is a modem-control function input whose condition can be tested by CPU 14 by reading bit 7 (DCD) of Modem Status Register 46. Bit 3 ($\overline{DDCD}$) of Modem Status Register 46 indicates whether the DCD input has changed state since the L previous reading of Modem Status Register 46. The $\overline{DCD}$ input has no affect on the receiver. Whenever the DCD bit of the Modem Status Register 46 changes state, an interrupt is generated if the Modem Status interrupt is enabled.

The Ring Indicator $\overline{RI}$ input, when low, indicates that a telephone ringing signal has been received by modem or peripheral 12. The $\overline{RI}$ signal is a modem-control function input whose condition can be tested by CPU 14 by reading bit 6 (RI) of Modem Status Register 46. Bit 2 (TERI) of Modem Status Register 46 indicates whether the $\overline{RI}$ input has changed from a low to a high state since the previous reading of Modem Status Register 46. Whenever the RI bit of Modem Status Register 46 changes from a high to a low state, an interrupt is generated if bit 3 of Interrupt Enable Register 32 is enabled.

The $V_{cc}$ input signal is a +5 volt supply.

The $V_{ss}$ input signal is ground (0 volt) reference.

The Data Terminal Ready $\overline{DTR}$ output signal, when low, informs the modem or peripheral 12 that Asynchronous Communications Element 10 is ready to communicate. The $\overline{DTR}$ output signal can be set to an active low by programming bit 0 (DTR) of Modem Control Register 48 to a high level. The $\overline{DTR}$ signal is set high upon a Master Reset MR operation. The $\overline{DTR}$ signal is forced to its inactive state (high) during loop mode operation.

The Request to Send $\overline{RTS}$ output signal, when low, informs the modem or peripheral 12 that Asynchronous Communications Element 10 is ready to transmit data. The $\overline{RTS}$ output signal can be set to inactive low by programming bit 1 (RTS) of Modem Control Register 48. The $\overline{RTS}$ signal is set high upon a Master Reset MR operation. The $\overline{RTS}$ signal is forced to its inactive state (high) during loop mode operation. The Output 1 $\overline{OUT\ 1}$ output signal is a user-designated output that can be set to an active low by programming bit 2 ($\overline{OUT\ 1}$) of Modem Control Register 48 to a high level. The $\overline{OUT\ 1}$ signal is set high upon a Master Reset MR operation. The OUT 1 signal is forced to its inactive state (high) during the loop mode operation.

The Output 2 $\overline{OUT\ 2}$ output signal is a user-designated output that can be set to inactive low by programming bit 3 ($\overline{OUT\ 2}$) of Modem Control Register 48 to a high level. The $\overline{OUT\ 2}$ signal is set high upon a Master Reset MR operation. The $\overline{OUT\ 2}$ signal is forced to its inactive state (high) during loop mode operation.

The Driver Disable DDIS output signal goes low whenever CPU 14 is reading data from the Asynchronous Communications Element 10. A high-level DDIS output can be used to disable an external transceiver (if used between CPU 14 and the Asynchronous Communications Element 10 on the $D_7$–$D_0$ data bus) at all times, except when CPU 14 is reading data.

The Baud Out $\overline{BAUD\ OUT}$ output signal is a 16× clock signal for the transmitter section of Asynchronous Communications Element 10. The clock rate is equal to the main reference oscillator frequency divided by the specified divisor in the Baud Generator Divisor Latches 22 and 24. The $\overline{BAUD\ OUT}$ signal may also be used for the receiver section by tying this output to the RCLK input of device 10.

The interrupt INTRPT output signal goes high whenever any one of the following interrupt types has an active high condition and is enabled via Interrupt Enable Register 32: Receiver Error Flag; Received Data Available and Timeout; Transmitter Holding Register Empty; and Modem Status. The INTRPT signal is reset low upon the appropriate interrupt service or a Master Reset MR operation.

The Serial Output (SOUT) output signal is a composite serial data output to the communications link 12 (peripheral, modem or data set). The SOUT signal is set to the Marking (logic 1) state upon a Master Reset MR operation.

The DATA ($D_7$–$D_0$) bus comprises eight tri-state Input/Output lines. The DATA bus provides bi-directional communication between Asynchronous Communications Element 10 and CPU 14. Data, control characters, and status information are transferred via the DATA bus $D_7$–$D_0$ data.

The two External Clock Input/Output signal (XTAL1, XTAL2) connect the main timing reference (crystal or signal clock) to Asynchronous Communications Element 10.

In the operation of Asynchronous Communications Element 10 in the FIFO Interrupt Mode, when Receiver FIFO 36 is enabled, that is, bit 0 of FIFO Control Register 52 equals 1, and receiver inputs, that is, bit 0 of Interrupt Enable Register 32 equals 1, are enabled, interrupts will occur as follows. The Received Data Available interrupt will be issued to CPU 14 when Receiver FIFO 36 has reached its programmed trigger level. It will be cleared as soon as Receiver FIFO 36 drops below its programmed trigger level. Interrupt Identification Register 44 Received Data Available indication also occurs when the trigger level of Receiver FIFO 36 is reached and, like the interrupt, it is cleared when Receiver FIFO 36 drops below the trigger level. The Receiver Line Status interrupt, as before, has higher priority than the Received Data Available interrupt. The Data Ready bit, that is bit 0 of Line Status Register 34, is set as soon as a character is transferred from Receiver Shift Register 38 to Receiver FIFO 36 or CPU 14 resets Receiver FIFO 36. It is reset when Receiver FIFO 36 is empty.

When Receiver FIFO 36 and receiver interrupts are enabled, Receiver FIFO 36 timeout interrupts will occur as follows. A Receiver FIFO 36 timeout interrupt will be provided to CPU 14 if there is at least one character in Receiver FIFO 36, at least four continuous character times have elapsed since the last character was received, and at least four continuous character times have elapsed since the most recent read of Receiver FIFO 36 by CPU 14. This will cause a maximum delay of 160 microseconds at 300 baud with 12 bits per character. Character times are calculated by using the RCLK input for a clock signal; this makes the delay proportional to the baud rate. When the timeout interrupt has occurred, it is cleared and the timer reset when CPU 14 reads one character from Receiver FIFO 36 or CPU 14 resets Receiver FIFO 36. When a timeout interrupt has not occurred, the timeout timer is reset after a new character is received or after CPU 14 reads Receiver FIFO 36.

When Transmitter FIFO 42 and transmitter interrupts are enabled, interrupts will occur as follows. The Transmitter Holding Register interrupt occurs when Transmitter FIFO 42 is empty. It is cleared as soon as Transmitter Holding Register 30 is written to (1-16 of characters may be written to Transmitter FIFO 42 while servicing this interrupt) or Interrupt Identification Register 44 is read. The Transmitter FIFO Empty indications will be delayed one character time minus the last Stop bit time whenever the following occurs: the Transmitter FIFO is empty and there have not been at least two characters in Transmitter FIFO 42 at the same time since the last time that Transmitter FIFO 42 was empty. The first transmitter interrupt after changing the first bit of FIFO Control Register 52 will be immediate if it is enabled. Thus, Transmitter FIFO 42 incorporates a time delay which eliminates multiple interrupts for a Transmitter FIFO Empty condition that has already been indicated to CPU 14.

The character timeout and Receiver FIFO Full Interrupts have the same priority as the Received Data Available Interrupt. The Transmitter FIFO Empty Indicator has the same priority as the Transmitter Holding Register Empty Indicator.

Resetting the first four bits of Interrupt Enable Register 32 or all to 0 places Asynchronous Communications Element 10 in the FIFO Polled Mode of operation. Since the Receiver and Transmitter FIFOs 36 and 42 are controlled separately, either one can be in the Polled Mode of operation.

In this mode, the program will check the status of Receiver FIFO 36 and Transmitter FIFO 42 via Line Status Register 34. As stated above, the first bit of Line Status Register 34 will be set as long as there is one character in Receiver FIFO 36. The second through fifth bits will specify which errors have occurred. Character error status is handled the same way as when in the Interrupt mode. That is, Interrupt Identification Register 44 is not affected since bit 2 of Interrupt Enable Register 32 equals 0. Bit 5 of Line Status Register 34 will indicate when Transmitter FIFO 42 is empty. Bit 6 of Line Status Register 34 will indicate that both Transmitter FIFO 42 and Transmitter Shift Register 40 are empty. Bit 7 of Line Status Register 34 will indicate whether there are any errors in the Receiver FIFO 36.

There is no trigger level reached or timeout condition indicated in the FIFO Polled Mode. However, Receiver FIFO 36 and Transmitter FIFO 42 are still fully capable of holding characters.

The timing diagrams for the various operations of Asynchronous Communication Element 10 are shown in FIGS. 5-12. FIG. 13 provides a key for interpreting the symbols used in FIGS. 5-12.

It should be understood that various alternatives to the structures described herein may be employed in practicing the present invention. It is intended that the following claims define the invention and that the structure within the scope of these claims and their equivalents be covered thereby.

What is claimed is:

1. A data communications system comprising:
   (a) a data processing system;
   (b) a data character source/destination station;
   (c) serial receiver means connectable to the source/destination station for receiving data characters from the source/destination station in serial format and performing serial-to-parallel conversion on said received data characters;
   (d) receiver storage element means connected to the serial receiver means for receiving data characters from the serial receiver means in parallel format and having storage capacity for only a single data character received from the serial receiver means, and connectable to the data processing system for transferring said single data character to the data processing system in parallel format, the receiver storage element means comprising a first receiver data path between the source/destination station and the data processing system;
   (e) receiver memory means connected to the serial receiver means for receiving data characters therefrom in parallel format and including a plurality of storage locations, the receiver memory means being responsive to a receiver enable signal for storing a plurality of data characters received from the serial receiver means in parallel format and connectable to the data processing system for transferring data characters to the data processing system in parallel format, the receiver memory means comprising a second receiver data path between the source/destination station and the data processing system;
   (f) receiver control means connectable to the data processing system and responsive to an enable control signal received therefrom for generating the receiver enable signal; and
   (g) receiver select means connected to the first and second receiver data paths and responsive to the receiver enable signal for disabling the first receiver data path and enabling the second receiver data path such that data characters transferred from the serial receiver means are transferred to the data processing system via the receiver memory means.

2. A data communications systems comprising:
   (a) a data processing system;

(b) a data character source/destination station;
(c) parallel transmitter means connectable to the source/destination station for receiving data characters in parallel format and performing parallel-to-serial conversion on said data characters for transfer to the source/destination station in serial format;
(d) transmitter storage element means connectable to the data processing system for receiving data characters therefrom in parallel format and having storage capacity for only a single data character received from the data processing system, and connectable to the parallel transmitter means for transferring said single data character to the parallel transmitter means in parallel format, the transmitter storage element means comprising a first transmitter data path between the data processing system and the source/destination station;
(e) transmitter memory means connectable to the data processing system for receiving data characters from the data processing system in parallel format and including a plurality of storage locations, the transmitter memory means being responsive to a transmitter enable signal for storing a plurality of data characters received from the data processing system in parallel format, the transmitter memory means being connected to the parallel transmitter means for transferring data characters thereto in parallel format, the transmitter memory means comprising a second transmitter data path between the data processing system and the source/destination station;
(f) transmitter control means connectable to the data processing system and responsive to an enable control signal received therefrom for generating the receiver enable signal; and
(g) transmitter select means connected to the first and second transmitter data paths and responsive to the transmitter enable signal for disabling the first transmitter data path and enabling the second transmitter data path such that data characters transferred from the data processing system are transferred to the parallel transmitter means via the transmitter memory means.

3. A data communications system comprising:
(a) a data processing system;
(b) a data character source/destination station;
(c) serial receiver means connectable to the source/destination station for receiving data characters from the source/destination station in serial format and performing serial-to-parallel conversion on said received data characters;
(d) receiver storage element means connected to the serial receiver means for receiving data characters from the serial receiver means in parallel format and having storage capacity for only a single data character received from the serial receiver means, and connectable to the data processing system for transferring said single data character thereto in parallel format, the receiver storage element means comprising a first receiver data path between the source/destination station and the data processing system;
(e) receiver memory means connected to the serial receiver means for receiving data characters therefrom in parallel format and including a plurality of storage locations, the receiver memory means being responsive to an enable signal for storing a plurality of data characters received from the serial receiver means in parallel format and connectable to the data processing system for transferring said plurality of data characters to the data processing system in parallel format, the receiver memory means comprising a second receiver data path between the source/destination station and the data processing system;
(f) parallel transmitter means connectable to the source/destination station and for receiving data characters in parallel format and performing parallel-to-serial conversion on data characters for transfer to the source/destination station in serial format;
(g) transmitter storage element means connectable to the data processing system for receiving data characters therefrom in parallel format and having storage capacity for only a single data character received from the data processing system, and connected to the parallel transmitter means for transferring said single data character to the parallel transmitter means in parallel format, the transmitter storage element means comprising a first transmitter data path between the data processing system and the source/destination station;
(h) transmitter memory means connectable to the data processing system for receiving a plurality of data characters from the data processing system in parallel format and including a plurality of storage locations, the transmitter memory means being responsive to the enable signal for storing a plurality of data characters received from the data processing system in parallel format, the transmitter memory means being connected to the parallel transmitter means for transferring data characters thereto in parallel format, the transmitter memory means comprising a second transmitter data path between the data processing system and the source/destination station;
(i) control means connectable to the data processing system and responsive to an enable control signal received therefrom for generating the enable signal;
(j) receiver select means connected to the first and second receiver data paths and responsive to the enable signal for disabling the first receiver data path and enabling the second receiver data path such that data characters transferred from the serial receiver means are transferred to the data processing system via the receiver memory means; and
(k) transmitter select means connected to the first and second transmitter data paths and that responsive to the enable signal for disabling the first transmitter data path and enabling the second transmitter data path such that data characters transferred from the data processing system are transferred to the parallel transmitter means via the transmitter memory means.

4. A data communications system comprising:
(a) a data processing system;
(b) a data character source/destination station;
(c) transmitter memory means connectable to the data processing system and comprising a plurality of storage locations for storing a plurality of data characters received from the data processing system in parallel format;
(d) parallel transmitter means connected to the transmitter memory means for receiving data characters in parallel format from the transmitter memory means for transfer to the source/destination station in serial format;

(e) indicator means connected to the transmitter memory means for generating an indicator signal when the transmitter memory means is empty;

(f) interrupt means connectable between the indicator means and the data processing system for issuing an interrupt signal to the data processing system in response to the indicator signal; and (g) delay means connected to the and to the indicator means for delaying the generation of a subsequent indicator signal after the interrupt signal has been issued to the data processing system if the transmitter memory means is empty and has simultaneously stored only less than a preselected number of data characters since the generation of the indicator signal.

5. A data communication system comprising:

(a) a data processing system;

(b) a data character source/destination station;

(c) serial receiver means connectable to the source/destination station for receiving data characters from the source/destination station in serial format and performing serial-to-parallel conversion on said received data characters;

(d) receiver memory means connected to the serial receiver means for receiving data characters therefrom in parallel format and including a plurality of storage locations for storing a plurality of data characters received from the serial receiver means for transfer to the data processing system in parallel format;

(e) transmitter memory means connectable to the data processing system and comprising a plurality of storage locations for storing a plurality of data characters received from the data processing system in parallel format;

(f) parallel transmitter means connected to the transmitter memory means for receiving data characters in parallel format from the transmitter memory means for transfer to the source/destination station in serial format;

(g) indicator means connected to the transmitter memory means for generating an indicator signal when the transmitter memory means is empty;

(h) interrupt means connectable between the indicator means and the data processing system for issuing an interrupt signal to the data processing system in response to the indicator signal; and (i) delay means connected to the interrupt means and to the indicator means for delaying the generation of a subsequent indicator signal after the interrupt signal has been issued to the data processing system if the transmitter memory means is empty and has simultaneously stored only less than a preselected number of data characters since the generation of the indicator signal.

6. A data communications system comprising:

(a) a data processing system;

(b) a data character source/destination station;

(c) serial receiver means connectable to the source/destination station for receiving data characters from the source/destination station in serial format and performing serial-to-parallel conversion on said received data characters;

(d) receiver memory means connected to the serial receiver means for receiving data characters therefrom in parallel format and that including a plurality of storage locations for storing a plurality of data characters received from the serial receiver means for transfer to the data processing system in parallel format;

(e) transmitter memory means connectable to the data processing system and comprising a plurality of storage locations for storing a plurality of data characters received from the data processing system in parallel format;

(f) parallel transmitter means connected to the transmitter memory means for receiving data characters in parallel format from the transmitter memory means for transfer to the source/destination station in serial format;

(g) line status register means connected to the transmitter memory means and responsive to the number of data characters stored in the transmitter memory means, the line status register means including indicator means for generating an initial empty indicator signal when the number of data characters stored in the transmitter memory means equals zero, and further including interrupt means connectable to the data processing system for issuing an interrupt signal to the data processing system in response to the initial empty indicator signal; and (h) delay means connected to the line status register means for delaying the generation of a subsequent empty indicator signal after the interrupt signal has been issued to the data processing system, the subsequent empty indicator signal being delayed by said delay means one data character time minus a last stop bit time if the number of data characters stored in the transmitter memory means equals zero and the transmitter memory means has simultaneously stored only less than a preselected number of data characters since the generation of the initial empty indicator signal.

7. A data communications system comprising:

(a) a data processing system;

(b) a data character source/destination station;

(c) serial receiver means connectable to the source/destination station for receiving data characters from the source/destination station in serial format and performing serial-to-parallel conversion on said received data characters;

(d) receiver memory means connected to the serial receiver means for receiving data characters therefrom in parallel format and including a plurality of storage locations for storing a plurality of data characters received from the serial receiver means, the receiver memory means being connectable to the data processing system for transferring data characters to the data processing system in parallel format;

(e) trigger means connected to the receiver memory means and responsive to the number of data characters stored in the receiver memory means for generating a trigger level signal when the number of data characters stored in the receiver memory means is at least a preselected number; and (f) interrupt means connectable between the trigger means and the data processing system and responsive to the trigger level signal for issuing a first interrupt signal to the data processing system, said interrupt means issuing a second interrupt signal to the data processing system when the number of data characters stored in the receiver memory means is less than the preselected number and (i) the serial receiver means has not received any data characters for a predetermined time out period and (ii) the receiver memory means has not transferred any data characters to the data processing system for the predetermined time out period.

8. A data communication device as in claim 7 wherein the preselected number is programmable by the data processing system.

9. A data communications system comprising:
   (a) a data processing system;
   (b) a data character source/destination station;
   (c) serial receiver means connectable to the source/destination station for receiving data characters from the source/destination station in serial format and performing serial-to-parallel conversion on said received data characters;
   (d) receiver memory means connected to the serial receiver means for receiving data characters therefrom in parallel format and including a plurality of storage locations for storing a plurality of data characters received from the serial receiver means for transfer to the data processing system in parallel format;
   (e) transmitter memory means connectable to the data processing system and comprising a plurality of storage locations for storing a plurality of data characters received from the data processing system in parallel format;
   (f) parallel transmitter means connected to the transmitter memory means for receiving data characters in parallel format from the transmitter memory means for transfer to the source/destination station in serial format;
   (g) trigger means connected to the receiver memory means and responsive to the number of data characters stored in the receiver memory means for generating a trigger level signal when the number of data characters stored in the receiver memory means is at least a preselected number; and
   (h) interrupt means connectable between the trigger means and the data processing system and responsive to the trigger level signal for issuing a first interrupt signal to the data processing system, said interrupt means issuing a second interrupt signal to the data processing system when the number of data characters stored in the receiver memory means is less than the preselected number and (i) the serial receiver means has not received any data characters for a predetermined time out period and (ii) the receiver memory means has not transferred any data characters to the data processing system for the predetermined time out period.

10. A data communications device as in claim 9 wherein the preselected number is programmable by the data processing system.

* * * * *